United States Patent
Dutta et al.

(10) Patent No.: US 12,395,827 B2
(45) Date of Patent: Aug. 19, 2025

(54) TECHNIQUES FOR SIDELINK DISCOVERY BETWEEN USER EQUIPMENTS ASSOCIATED WITH DIFFERENT DISCOVERY MODELS

(71) Applicant: QUALCOMM Incorporated, San Diego, CA (US)

(72) Inventors: Sourjya Dutta, San Diego, CA (US);
Kapil Gulati, Belle Mead, NJ (US);
Hong Cheng, Basking Ridge, NJ (US);
Gabi Sarkis, San Diego, CA (US);
Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 463 days.

(21) Appl. No.: 17/174,267

(22) Filed: Feb. 11, 2021

(65) Prior Publication Data

US 2022/0256326 A1    Aug. 11, 2022

(51) Int. Cl.
*H04W 8/00* (2009.01)
*H04B 7/06* (2006.01)
(Continued)

(52) U.S. Cl.
CPC .......... *H04W 8/005* (2013.01); *H04B 7/0617* (2013.01); *H04W 16/28* (2013.01); *H04W 92/18* (2013.01)

(58) Field of Classification Search
None
See application file for complete search history.

(56) References Cited

U.S. PATENT DOCUMENTS

| | | | | |
|---|---|---|---|---|
| 2010/0165882 A1* | 7/2010 | Palanki | ................ | H04W 76/14 370/254 |
| 2011/0258313 A1* | 10/2011 | Mallik | ................ | H04W 8/005 709/224 |

(Continued)

FOREIGN PATENT DOCUMENTS

| | | | | |
|---|---|---|---|---|
| WO | WO-2016054578 A1 * | 4/2016 | ............. | H04L 63/08 |
| WO | WO-2020256875 A1 | 12/2020 | | |

OTHER PUBLICATIONS

"3rd Generation Partnership Project, Technical Specification Group Services and System Aspects, Study on Architecture Enhancements to Support Proximity-Based Services (ProSe) (Release 12) ", 3GPP Standard, 3GPP TR 23.703, 3RD Generation Partnership Project (3GPP), Mobile Competence Centre, 650, Route Des Lucioles, F-06921 Sophia-Antipolis Cedex, France, vol. SA WG2, No. V1.1. 0, Jan. 28, 2014 (Jan. 28, 2014), XP050729424, pp. 1-348, [retrieved on Jan. 28, 2014] p. 30-p. 36.

(Continued)

*Primary Examiner* — Ayman A Abaza
*Assistant Examiner* — Camquyen Thai
(74) *Attorney, Agent, or Firm* — Dalei Dong; Harrity & Harrity, LLP

(57) ABSTRACT

Various aspects of the present disclosure generally relate to wireless communication. In some aspects, a first user equipment (UE) may receive, from a second UE via a sidelink interface between the first UE and the second UE, an indication of a device discovery model associated with the second UE, wherein the device discovery model associated with the second UE is different than a device discovery model associated with the first UE. The UE may perform a device discovery with the second UE based at least in part on the device discovery model associated with the second UE. Numerous other aspects are described.

30 Claims, 15 Drawing Sheets

(51) Int. Cl.
*H04W 16/28* (2009.01)
*H04W 92/18* (2009.01)

(56) References Cited

U.S. PATENT DOCUMENTS

| | | | |
|---|---|---|---|
| 2013/0059583 A1 | 3/2013 | Van et al. | |
| 2014/0198696 A1* | 7/2014 | Li | H04W 52/0229 |
| | | | 370/311 |
| 2015/0188965 A1* | 7/2015 | Putterman | H04L 65/1101 |
| | | | 709/219 |
| 2015/0326737 A1* | 11/2015 | Li | H04W 4/24 |
| | | | 455/406 |
| 2016/0050702 A1* | 2/2016 | Sorrentino | H04W 8/005 |
| | | | 370/329 |
| 2016/0212721 A1* | 7/2016 | Sheng | H04W 48/18 |
| 2016/0212780 A1* | 7/2016 | Stojanovski | H04W 8/005 |
| 2016/0269185 A1* | 9/2016 | Stojanovski | H04W 8/005 |
| 2016/0302062 A1* | 10/2016 | Lehtovirta | H04W 12/04 |
| 2016/0323129 A1* | 11/2016 | Wang | H04W 76/11 |
| 2016/0330603 A1 | 11/2016 | Chuang | |
| 2017/0337394 A1* | 11/2017 | Wang | H04L 67/51 |
| 2018/0035278 A1* | 2/2018 | Aminaka | H04W 76/14 |
| 2018/0199262 A1* | 7/2018 | Kuge | H04W 12/06 |
| 2018/0227972 A1* | 8/2018 | Tsuboi | H04W 8/00 |
| 2018/0343605 A1* | 11/2018 | Wu | H04W 8/005 |
| 2019/0090293 A1* | 3/2019 | Su | H04W 8/005 |
| 2019/0110281 A1* | 4/2019 | Zhou | H04W 76/19 |
| 2019/0124698 A1* | 4/2019 | Wu | H04W 4/40 |
| 2019/0150057 A1* | 5/2019 | Wang | H04W 36/16 |
| | | | 370/311 |
| 2019/0223231 A1* | 7/2019 | Muraoka | H04W 76/11 |
| 2019/0253867 A1* | 8/2019 | Abedini | H04J 13/0062 |
| 2019/0253955 A1* | 8/2019 | Abedini | H04L 1/005 |
| 2019/0373493 A1* | 12/2019 | Uchiyama | H04L 41/5003 |
| 2019/0380121 A1* | 12/2019 | Wu | H04W 36/03 |
| 2019/0380152 A1* | 12/2019 | Abedini | H04W 56/0045 |
| 2020/0336902 A1* | 10/2020 | Wang | H04W 76/14 |
| 2020/0413239 A1* | 12/2020 | Pu | H04W 24/08 |
| 2021/0058914 A1* | 2/2021 | Chae | H04B 7/0695 |
| 2021/0168574 A1* | 6/2021 | Zhang | H04W 4/40 |
| 2021/0219143 A1* | 7/2021 | Khalid | H04W 8/005 |
| 2022/0286184 A1* | 9/2022 | Li | H04L 5/0051 |
| 2023/0388770 A1* | 11/2023 | Wang | H04W 76/14 |

OTHER PUBLICATIONS

CATT: "Relay Initiation", 3GPP Draft, 3GPP Draft, 3GPP TSG RAN WG2 Meeting #90, R2-152321, 3ed Generation Partnership Project (3GPP), Mobile Competence Centre, 650, Route Des Lucioles, F-06921 Sophia-Antipolis Cedex, France, vol. RAN WG2, No. Fukuoka, Japan, May 25, 2015-May 29, 2015 May 24, 2015 (May 24, 2015), XP050971400, pp. 1-4, Retrieved from the Internet: URL: http://www.3gpp.org/ftp/Meetings_3GPP_SYNC/RAN2/ Docs/ [retrieved on may 24, 2015] p. 3.

Ericsson: "On the NR Sidelink Discovery", 3GPP Draft, 3GPP TSG-RAN WG1 Meeting #96, R1-1903178 (Resubmission of R1-1901225), Ericsson—On NR Sidelink Discovery, 3RD Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019 Feb. 15, 2019 (Feb. 15, 2019), XP051600874, 3 Pages, Retrieved from the Internet: URL: http://www.3gpp.org/ftp/tsg%5Fran/WG1% 5FRL1/TSGR1%5F96/Docs/R1%2D1903178%2Ezip [retrieved on Feb. 15, 2019] Section 2.

International Search Report and Written Opinion—PCT/US2022/ 070160—ISA/EPO—Apr. 26, 2022.

Qualcomm Incorporated: "Update of Solution D1: Support of Different Discovery Modes", 3GPP Draft, S2-140562 (was S2-140079)- D1-Update-Discoverymode-R7, 3rd Generation Partnership Project (3GPP), Mobile Competence Centre, 650, Route Des Lucioles, F-06921 Sophia-Antipolis Cedex, France, vol. SA WG2, No. Taipei, Taiwan, Jan. 20, 2014-Jan. 24, 2014 Jan. 24, 2014 (Jan. 24, 2014), XP050765635, pp. 1-5, Retrieved from the Internet: URL: http:// www.3gpp.org/ftp/tsg_sa/WG2_Arch/TSGS2_101_Taipei/Docs/ [retrieved on Jan. 24, 2014] p. 1-p. 3.

* cited by examiner

TECHNIQUES FOR SIDELINK DISCOVERY BETWEEN USER EQUIPMENTS ASSOCIATED WITH DIFFERENT DISCOVERY MODELS

FIELD OF THE DISCLOSURE

Aspects of the present disclosure generally relate to wireless communication and to techniques and apparatuses for sidelink discovery between user equipments (UEs) associated with different discovery models.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of UEs. A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first user equipment (UE) includes receiving, from a second UE via a sidelink interface between the first UE and the second UE, an indication of a device discovery model associated with the second UE, wherein the device discovery model associated with the second UE is different than a device discovery model associated with the first UE; and performing a device discovery with the second UE based at least in part on the device discovery model associated with the second UE.

In some aspects, the indication is a beam training reference signal sequence.

In some aspects, the indication is a beam training response sequence.

In some aspects, the indication is a sequence selected from a first set of sequences associated with a first device discovery model.

In some aspects, the indication is a sequence selected from a second set of sequences associated with a second device discovery model.

In some aspects, the indication is a sequence, and further comprising: receiving, from a base station, a configuration that indicates: a first set of sequences including the sequence associated with a first device discovery model, or a second set of sequences including the sequence associated with a second device discovery model.

In some aspects, the method includes determining that the device discovery model associated with the second UE is different than the device discovery model associated with the first UE.

In some aspects, the indication is a first indication, and performing the device discovery comprises transmitting a second indication to the second UE based at least in part on the device discovery model associated with the second UE, and the first indication is a beam training reference signal sequence and the second indication is a beam training response sequence.

In some aspects, a method of wireless communication performed by a first UE includes transmitting, to a second UE via a sidelink interface between the first UE and the second UE, an indication of a device discovery model associated with the first UE, wherein a device discovery model associated with the second UE is initially different than the device discovery model associated with the first UE; and performing a device discovery with the second UE based at least in part on the device discovery model associated with the first UE.

In some aspects, the indication is a beam training reference signal sequence.

In some aspects, the indication is a beam training response sequence.

In some aspects, the indication is a sequence, and further comprising: selecting the sequence from a first set of sequences associated with a first device discovery model.

In some aspects, the indication is a sequence, and further comprising: selecting the sequence from a second set of sequences associated with a second device discovery model.

In some aspects, the indication is a sequence, and further comprising: receiving, from a base station, a configuration that indicates: a first set of sequences including the sequence associated with a first device discovery model, or a second set of sequences including the sequence associated with a second device discovery model.

In some aspects, the indication is a first indication, and performing the device discovery comprises receiving a second indication to the second UE based at least in part on the device discovery model associated with the second UE, and the first indication is a beam training reference signal sequence and the second indication is a beam training response sequence.

In some aspects, a method of wireless communication performed by a first UE includes transmitting a beam training response sequence in a direction to a second UE; determining that a discovery request message has not been received in the direction from the second UE based at least in part on a device discovery model associated with the second UE being different than a device discovery model associated with the first UE; and performing a device discovery with the second UE based at least in part on the device discovery model associated with the second UE being different than the device discovery model associated with the first UE.

In some aspects, performing the device discovery comprises: transmitting a discovery announcement in the direction associated with the beam training response sequence to the second UE; and monitoring a channel to receive a discovery response message from the second UE.

In some aspects, performing the device discovery comprises: monitoring a channel to receive a discovery request message from the second UE in accordance with a timer; and transmitting a discovery announcement message in the direction associated with the beam training response sequence to the second UE based at least in part on an expiry of the timer.

In some aspects, the first UE is associated with a first device discovery model, and the second UE is associated with a second device discovery model.

In some aspects, performing the device discovery comprises performing the device discovery based at least in part on a device discovery model associated with the first UE.

In some aspects, performing the device discovery based at least in part on the device discovery model associated with the first UE further comprises transmitting discovery announcement messages to the second UE, and discovery request messages are not received from the second UE in the direction associated with the beam training response sequence.

In some aspects, performing the device discovery comprises performing the device discovery based at least in part on a device discovery model associated with the second UE.

In some aspects, performing the device discovery based at least in part on the device discovery model associated with the second UE further comprises stopping a transmission of discovery announcement messages and monitoring a channel to listen for discovery request messages from the second UE.

In some aspects, a method of wireless communication performed by a first UE includes receiving a beam training response sequence in a direction from a second UE; determining that a discovery announcement message has not been received in the direction from the second UE based at least in part on a device discovery model associated with the second UE being different than a device discovery model associated with the first UE; and performing a device discovery with the second UE based at least in part on the device discovery model associated with the second UE being different than the device discovery model associated with the first UE.

In some aspects, the method includes determining that the beam training response sequence is associated with the second UE that has not been discovered by the first UE based at least in part on discovery announcement messages that have been received at the first UE.

In some aspects, performing the device discovery comprises: transmitting a discovery request message in the direction associated with the beam training response sequence to the second UE; and monitoring a channel to receive a discovery response message from the second UE.

In some aspects, performing the device discovery comprises: monitoring a channel to receive a discovery announcement message from the second UE in accordance with a timer; and transmitting a discovery request message in the direction associated with the beam training response sequence to the second UE based at least in part on an expiry of the timer.

In some aspects, the first UE is associated with a first device discovery model, and the second UE is associated with a second device discovery model.

In some aspects, performing the device discovery comprises performing the device discovery based at least in part on a device discovery model associated with the first UE, and further comprises stopping a transmission of discovery request messages in the direction associated with the beam training response sequence and monitoring a channel to listen for discovery announcement messages from the second UE.

In some aspects, performing the device discovery comprises performing the device discovery based at least in part on a device discovery model associated with the second UE, and further comprises transmitting discovery request messages to the second UE.

In some aspects, a first UE for wireless communication includes a memory; and one or more processors operatively coupled to the memory, the memory and the one or more processors configured to: receive, from a second UE via a sidelink interface between the first UE and the second UE, an indication of a device discovery model associated with the second UE, wherein the device discovery model associated with the second UE is different than a device discovery model associated with the first UE; and perform a device discovery with the second UE based at least in part on the device discovery model associated with the second UE.

In some aspects, the indication is a beam training reference signal sequence.

In some aspects, the indication is a beam training response sequence.

In some aspects, the indication is a sequence selected from a first set of sequences associated with a first device discovery model.

In some aspects, the indication is a sequence selected from a second set of sequences associated with a second device discovery model.

In some aspects, the indication is a sequence, and the memory and the one or more processors are further configured to: receive, from a base station, a configuration that indicates: a first set of sequences including the sequence associated with a first device discovery model, or a second set of sequences including the sequence associated with a second device discovery model.

In some aspects, the memory and the one or more processors are further configured to: determine that the device discovery model associated with the second UE is different than the device discovery model associated with the first UE.

In some aspects, the indication is a first indication, and the memory and the one or more processors, when performing the device discovery, are further configured to transmit a second indication to the second UE based at least in part on the device discovery model associated with the second UE, and the first indication is a beam training reference signal sequence and the second indication is a beam training response sequence.

In some aspects, a first UE for wireless communication includes a memory; and one or more processors operatively coupled to the memory, the memory and the one or more processors configured to: transmit, to a second UE via a sidelink interface between the first UE and the second UE, an indication of a device discovery model associated with the first UE, wherein a device discovery model associated with the second UE is initially different than the device discovery model associated with the first UE; and perform a device discovery with the second UE based at least in part on the device discovery model associated with the first UE.

In some aspects, the indication is a beam training reference signal sequence.

In some aspects, the indication is a beam training response sequence.

In some aspects, the indication is a sequence, and the memory and the one or more processors are further configured to: select the sequence from a first set of sequences associated with a first device discovery model.

In some aspects, the indication is a sequence, and the memory and the one or more processors are further configured to: select the sequence from a second set of sequences associated with a second device discovery model.

In some aspects, the indication is a sequence, and the memory and the one or more processors are further configured to: receive, from a base station, a configuration that indicates: a first set of sequences including the sequence associated with a first device discovery model, or a second set of sequences including the sequence associated with a second device discovery model.

In some aspects, the indication is a first indication, and the memory and the one or more processors, when performing the device discovery, are further configured to receive a second indication to the second UE based at least in part on the device discovery model associated with the second UE, and the first indication is a beam training reference signal sequence and the second indication is a beam training response sequence.

In some aspects, a first UE for wireless communication includes a memory; and one or more processors operatively coupled to the memory, the memory and the one or more processors configured to: transmit a beam training response sequence in a direction to a second UE; determine that a discovery request message has not been received in the direction from the second UE based at least in part on a device discovery model associated with the second UE being different than a device discovery model associated with the first UE; and perform a device discovery with the second UE based at least in part on the device discovery model associated with the second UE being different than the device discovery model associated with the first UE.

In some aspects, the memory and the one or more processors, when performing the device discovery, are configured to: transmit a discovery announcement in the direction associated with the beam training response sequence to the second UE; and monitor a channel to receive a discovery response message from the second UE.

In some aspects, the memory and the one or more processors, when performing the device discovery, are configured to: monitor a channel to receive a discovery request message from the second UE in accordance with a timer; and transmit a discovery announcement message in the direction associated with the beam training response sequence to the second UE based at least in part on an expiry of the timer.

In some aspects, the first UE is associated with a first device discovery model, and the second UE is associated with a second device discovery model.

In some aspects, the memory and the one or more processors, when performing the device discovery, are configured to perform the device discovery based at least in part on a device discovery model associated with the first UE.

In some aspects, the memory and the one or more processors, when performing the device discovery, are configured to transmit discovery announcement messages to the second UE, and discovery request messages are not received from the second UE in the direction associated with the beam training response sequence.

In some aspects, the memory and the one or more processors, when performing the device discovery, are configured to perform the device discovery based at least in part on a device discovery model associated with the second UE.

In some aspects, the memory and one or more processors, when performing the device discovery based at least in part on the device discovery model associated with the second UE, are configured to stop a transmission of discovery announcement messages and monitoring a channel to listen for discovery request messages from the second UE.

In some aspects, a first UE for wireless communication includes a memory; and one or more processors operatively coupled to the memory, the memory and the one or more processors configured to: receive a beam training response sequence in a direction from a second UE; determine that a discovery announcement message has not been received in the direction from the second UE based at least in part on a device discovery model associated with the second UE being different than a device discovery model associated with the first UE; and perform a device discovery with the second UE based at least in part on the device discovery model associated with the second UE being different than the device discovery model associated with the first UE.

In some aspects, the memory and the one or more processors are further configured to: determine that the beam training response sequence is associated with the second UE that has not been discovered by the first UE based at least in part on discovery announcement messages that have been received at the first UE.

In some aspects, the memory and the one or more processors, when performing the device discovery, are configured to: transmit a discovery request message in the direction associated with the beam training response sequence to the second UE; and monitor a channel to receive a discovery response message from the second UE.

In some aspects, the memory and the one or more processors, when performing the device discovery, are configured to: monitor a channel to receive a discovery announcement message from the second UE in accordance with a timer; and transmit a discovery request message in the direction associated with the beam training response sequence to the second UE based at least in part on an expiry of the timer.

In some aspects, the first UE is associated with a first device discovery model, and the second UE is associated with a second device discovery model.

In some aspects, the memory and the one or more processors, when performing the device discovery, are configured to: perform the device discovery based at least in part on a device discovery model associated with the first UE; stop a transmission of discovery request messages in the direction associated with the beam training response sequence; and monitor a channel to listen for discovery announcement messages from the second UE.

In some aspects, the memory and the one or more processors, when performing the device discovery, are configured to: perform the device discovery based at least in part on a device discovery model associated with the second UE; and transmit discovery request messages to the second UE.

In some aspects, a non-transitory computer-readable medium storing a set of instructions for wireless communication includes one or more instructions that, when executed by one or more processors of a first UE, cause the first UE to: receive, from a second UE via a sidelink interface between the first UE and the second UE, an indication of a device discovery model associated with the second UE, wherein the device discovery model associated with the second UE is different than a device discovery model associated with the first UE; and perform a device discovery with the second UE based at least in part on the device discovery model associated with the second UE.

In some aspects, the indication is a beam training reference signal sequence.

In some aspects, the indication is a beam training response sequence.

In some aspects, the indication is a sequence selected from a first set of sequences associated with a first device discovery model.

In some aspects, the indication is a sequence selected from a second set of sequences associated with a second device discovery model.

In some aspects, the one or more instructions further cause the first UE to: receive, from a base station, a configuration that indicates: a first set of sequences including the sequence associated with a first device discovery model, or a second set of sequences including the sequence associated with a second device discovery model.

In some aspects, the one or more instructions further cause the first UE to: determine that the device discovery model associated with the second UE is different than the device discovery model associated with the first UE.

In some aspects, the indication is a first indication, and the one or more instructions further cause the first UE to transmit a second indication to the second UE based at least in part on the device discovery model associated with the second UE, and the first indication is a beam training reference signal sequence and the second indication is a beam training response sequence.

In some aspects, a non-transitory computer-readable medium storing a set of instructions for wireless communication includes one or more instructions that, when executed by one or more processors of a first UE, cause the first UE to: transmit, to a second UE via a sidelink interface between the first UE and the second UE, an indication of a device discovery model associated with the first UE, wherein a device discovery model associated with the second UE is initially different than the device discovery model associated with the first UE; and perform a device discovery with the second UE based at least in part on the device discovery model associated with the first UE.

In some aspects, the indication is a beam training reference signal sequence.

In some aspects, the indication is a beam training response sequence.

In some aspects, the one or more instructions further cause the UE to: select the sequence from a first set of sequences associated with a first device discovery model.

In some aspects, the one or more instructions further cause the UE to: select the sequence from a second set of sequences associated with a second device discovery model.

In some aspects, the one or more instructions further cause the UE to: receive, from a base station, a configuration that indicates: a first set of sequences including the sequence associated with a first device discovery model, or a second set of sequences including the sequence associated with a second device discovery model.

In some aspects, the indication is a first indication, and the one or more instructions further cause the first UE to receive a second indication to the second UE based at least in part on the device discovery model associated with the second UE, and the first indication is a beam training reference signal sequence and the second indication is a beam training response sequence.

In some aspects, a non-transitory computer-readable medium storing a set of instructions for wireless communication includes one or more instructions that, when executed by one or more processors of a first UE, cause the first UE to: transmit a beam training response sequence in a direction to a second UE; determine that a discovery request message has not been received in the direction from the second UE based at least in part on a device discovery model associated with the second UE being different than a device discovery model associated with the first UE; and perform a device discovery with the second UE based at least in part on the device discovery model associated with the second UE being different than the device discovery model associated with the first UE.

In some aspects, the one or more instructions, that cause the first UE to perform the device discovery, cause the first UE to: transmit a discovery announcement in the direction associated with the beam training response sequence to the second UE; and monitor a channel to receive a discovery response message from the second UE.

In some aspects, the one or more instructions, that cause the first UE to perform the device discovery, cause the first UE to: monitor a channel to receive a discovery request message from the second UE in accordance with a timer; and transmit a discovery announcement message in the direction associated with the beam training response sequence to the second UE based at least in part on an expiry of the timer.

In some aspects, the first UE is associated with a first device discovery model, and the second UE is associated with a second device discovery model.

In some aspects, the one or more instructions, that cause the first UE to perform the device discovery, cause the first UE to perform the device discovery based at least in part on a device discovery model associated with the first UE.

In some aspects, the one or more instructions, that cause the first UE to perform the device discovery based at least in part on the device discovery model associated with the first UE, cause the first UE to transmit discovery announcement messages to the second UE, and discovery request messages are not received from the second UE in the direction associated with the beam training response sequence.

In some aspects, the one or more instructions, that cause the first UE to perform the device discovery, cause the first UE to perform the device discovery based at least in part on a device discovery model associated with the second UE.

In some aspects, the one or more instructions, that cause the first UE to perform the device discovery based at least in part on the device discovery model associated with the second UE, cause the first UE to stop a transmission of discovery announcement messages and monitor a channel to listen for discovery request messages from the second UE.

In some aspects, a non-transitory computer-readable medium storing a set of instructions for wireless communication includes one or more instructions that, when executed by one or more processors of a first UE, cause the first UE to: receive a beam training response sequence in a direction from a second UE; determine that a discovery announcement message has not been received in the direction from the second UE based at least in part on a device discovery model associated with the second UE being different than a device discovery model associated with the first UE; and perform a device discovery with the second UE based at least in part on the device discovery model associated with the second UE being different than the device discovery model associated with the first UE.

In some aspects, the one or more instructions further cause the first UE to: determine that the beam training response sequence is associated with the second UE that has not been discovered by the first UE based at least in part on discovery announcement messages that have been received at the first UE.

In some aspects, the one or more instructions, that cause the first UE to perform the device discovery, cause the first UE to: transmit a discovery request message in the direction associated with the beam training response sequence to the second UE; and monitor a channel to receive a discovery response message from the second UE.

In some aspects, the one or more instructions, that cause the first UE to perform the device discovery, cause the first UE to: monitor a channel to receive a discovery announcement message from the second UE in accordance with a timer; and transmit a discovery request message in the direction associated with the beam training response sequence to the second UE based at least in part on an expiry of the timer.

In some aspects, the first UE is associated with a first device discovery model, and the second UE is associated with a second device discovery model.

In some aspects, the one or more instructions, that cause the first UE to perform the device discovery, cause the first UE to: perform the device discovery based at least in part on a device discovery model associated with the first UE; stop a transmission of discovery request messages in the direction associated with the beam training response sequence; and monitor a channel to listen for discovery announcement messages from the second UE.

In some aspects, the one or more instructions, that cause the first UE to perform the device discovery, cause the first UE to: perform the device discovery based at least in part on a device discovery model associated with the second UE; and transmit discovery request messages to the second UE.

In some aspects, a first apparatus for wireless communication includes means for receiving, from a second apparatus via a sidelink interface between the first apparatus and the second apparatus, an indication of a device discovery model associated with the second apparatus, wherein the device discovery model associated with the second apparatus is different than a device discovery model associated with the first apparatus; and means for performing a device discovery with the second apparatus based at least in part on the device discovery model associated with the second apparatus.

In some aspects, the indication is a beam training reference signal sequence.

In some aspects, the indication is a beam training response sequence.

In some aspects, the indication is a sequence selected from a first set of sequences associated with a first device discovery model.

In some aspects, the indication is a sequence selected from a second set of sequences associated with a second device discovery model.

In some aspects, the apparatus includes means for receiving, from a base station, a configuration that indicates: a first set of sequences including the sequence associated with a first device discovery model, or a second set of sequences including the sequence associated with a second device discovery model.

In some aspects, the apparatus includes means for determining that the device discovery model associated with the second apparatus is different than the device discovery model associated with the first apparatus.

In some aspects, the indication is a first indication, and performing the device discovery comprises transmitting a second indication to the second apparatus based at least in part on the device discovery model associated with the second apparatus, and the first indication is a beam training reference signal sequence and the second indication is a beam training response sequence.

In some aspects, a first apparatus for wireless communication includes means for transmitting, to a second apparatus via a sidelink interface between the first apparatus and the second apparatus, an indication of a device discovery model associated with the first apparatus, wherein a device discovery model associated with the second apparatus is initially different than the device discovery model associated with the first apparatus; and means for performing a device discovery with the second apparatus based at least in part on the device discovery model associated with the first apparatus.

In some aspects, the indication is a beam training reference signal sequence.

In some aspects, the indication is a beam training response sequence.

In some aspects, the apparatus includes means for selecting the sequence from a first set of sequences associated with a first device discovery model.

In some aspects, the apparatus includes means for selecting the sequence from a second set of sequences associated with a second device discovery model.

In some aspects, the apparatus includes means for receiving, from a base station, a configuration that indicates: a first set of sequences including the sequence associated with a first device discovery model, or a second set of sequences including the sequence associated with a second device discovery model.

In some aspects, the indication is a first indication, and performing the device discovery comprises receiving a second indication to the second apparatus based at least in part on the device discovery model associated with the second apparatus, and the first indication is a beam training reference signal sequence and the second indication is a beam training response sequence.

In some aspects, a first apparatus for wireless communication includes means for transmitting a beam training response sequence in a direction to a second apparatus; means for determining that a discovery request message has not been received in the direction from the second apparatus based at least in part on a device discovery model associated with the second apparatus being different than a device discovery model associated with the first apparatus; and means for performing a device discovery with the second apparatus based at least in part on the device discovery model associated with the second apparatus being different than the device discovery model associated with the first apparatus.

In some aspects, the means for performing the device discovery comprises: means for transmitting a discovery announcement in the direction associated with the beam training response sequence to the second apparatus; and means for monitoring a channel to receive a discovery response message from the second apparatus.

In some aspects, the means for performing the device discovery comprises: means for monitoring a channel to receive a discovery request message from the second apparatus in accordance with a timer; and means for transmitting a discovery announcement message in the direction associated with the beam training response sequence to the second apparatus based at least in part on an expiry of the timer.

In some aspects, the first apparatus is associated with a first device discovery model and the second apparatus is associated with a second device discovery model.

In some aspects, the means for performing the device discovery comprises means for performing the device discovery based at least in part on a device discovery model associated with the first apparatus.

In some aspects, performing the device discovery based at least in part on the device discovery model associated with the first apparatus further comprises transmitting discovery announcement messages to the second apparatus, and discovery request messages are not received from the second apparatus in the direction associated with the beam training response sequence.

In some aspects, the means for performing the device discovery comprises means for performing the device discovery based at least in part on a device discovery model associated with the second apparatus.

In some aspects, the means for performing the device discovery based at least in part on the device discovery model associated with the second apparatus further comprises means for stopping a transmission of discovery announcement messages and monitoring a channel to listen for discovery request messages from the second apparatus.

In some aspects, a first apparatus for wireless communication includes means for receiving a beam training response sequence in a direction from a second apparatus; means for determining that a discovery announcement message has not been received in the direction from the second apparatus based at least in part on a device discovery model associated with the second apparatus being different than a device discovery model associated with the first apparatus; and means for performing a device discovery with the second apparatus based at least in part on the device discovery model associated with the second apparatus being different than the device discovery model associated with the first apparatus.

In some aspects, the apparatus includes means for determining that the beam training response sequence is associated with the second apparatus that has not been discovered by the first apparatus based at least in part on discovery announcement messages that have been received at the first apparatus.

In some aspects, the means for performing the device discovery comprises: means for transmitting a discovery request message in the direction associated with the beam training response sequence to the second apparatus; and means for monitoring a channel to receive a discovery response message from the second apparatus.

In some aspects, the means for performing the device discovery comprises: means for monitoring a channel to receive a discovery announcement message from the second apparatus in accordance with a timer; and means for transmitting a discovery request message in the direction associated with the beam training response sequence to the second apparatus based at least in part on an expiry of the timer.

In some aspects, the first apparatus is associated with a first device discovery model and the second apparatus is associated with a second device discovery model.

In some aspects, the means for performing the device discovery comprises means for performing the device discovery based at least in part on a device discovery model associated with the first apparatus, and further comprises stopping a transmission of discovery request messages in the direction associated with the beam training response sequence and monitoring a channel to listen for discovery announcement messages from the second apparatus.

In some aspects, the means for performing the device discovery comprises means for performing the device discovery based at least in part on a device discovery model associated with the second apparatus, and further comprises transmitting discovery request messages to the second apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
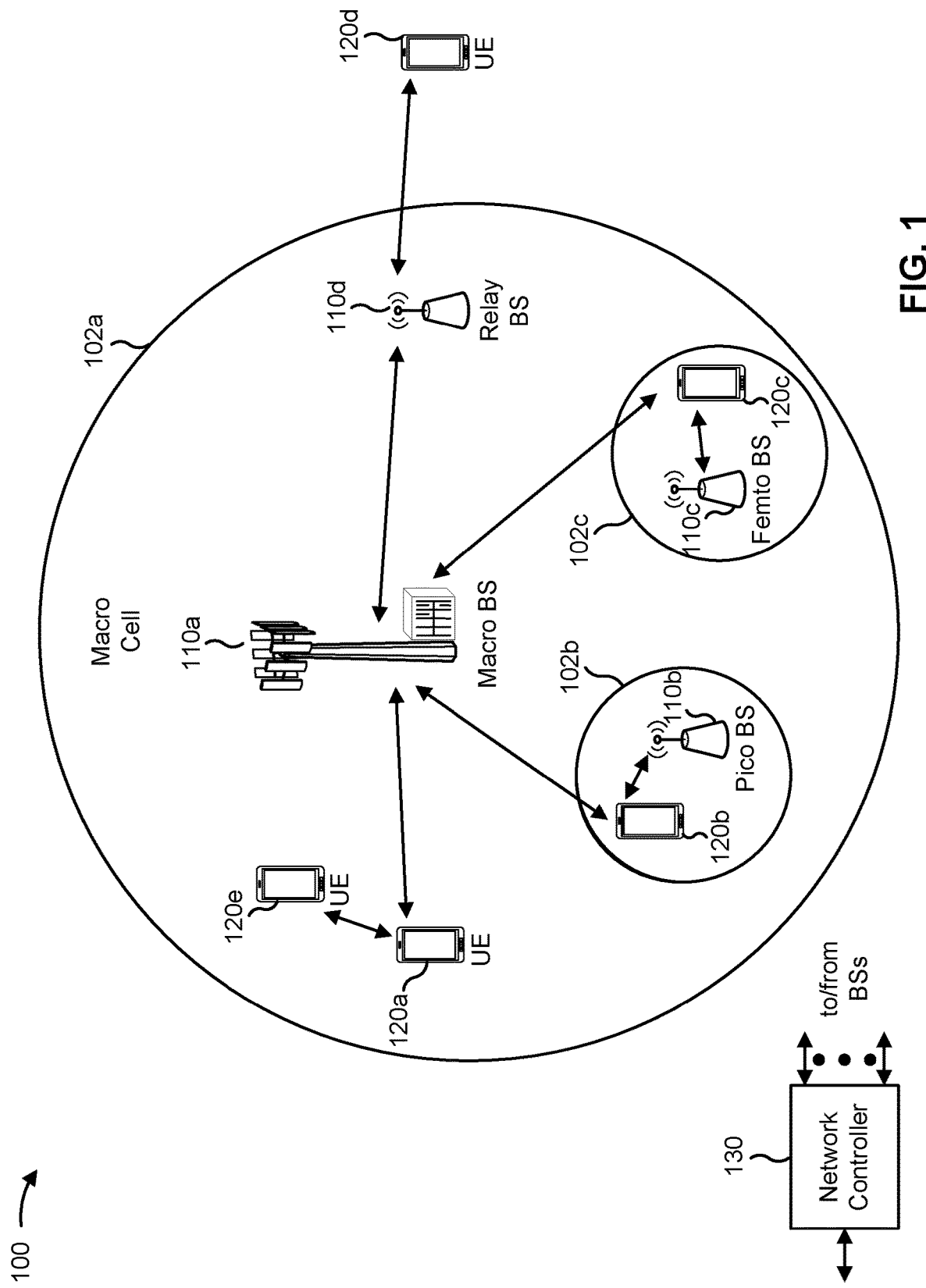
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
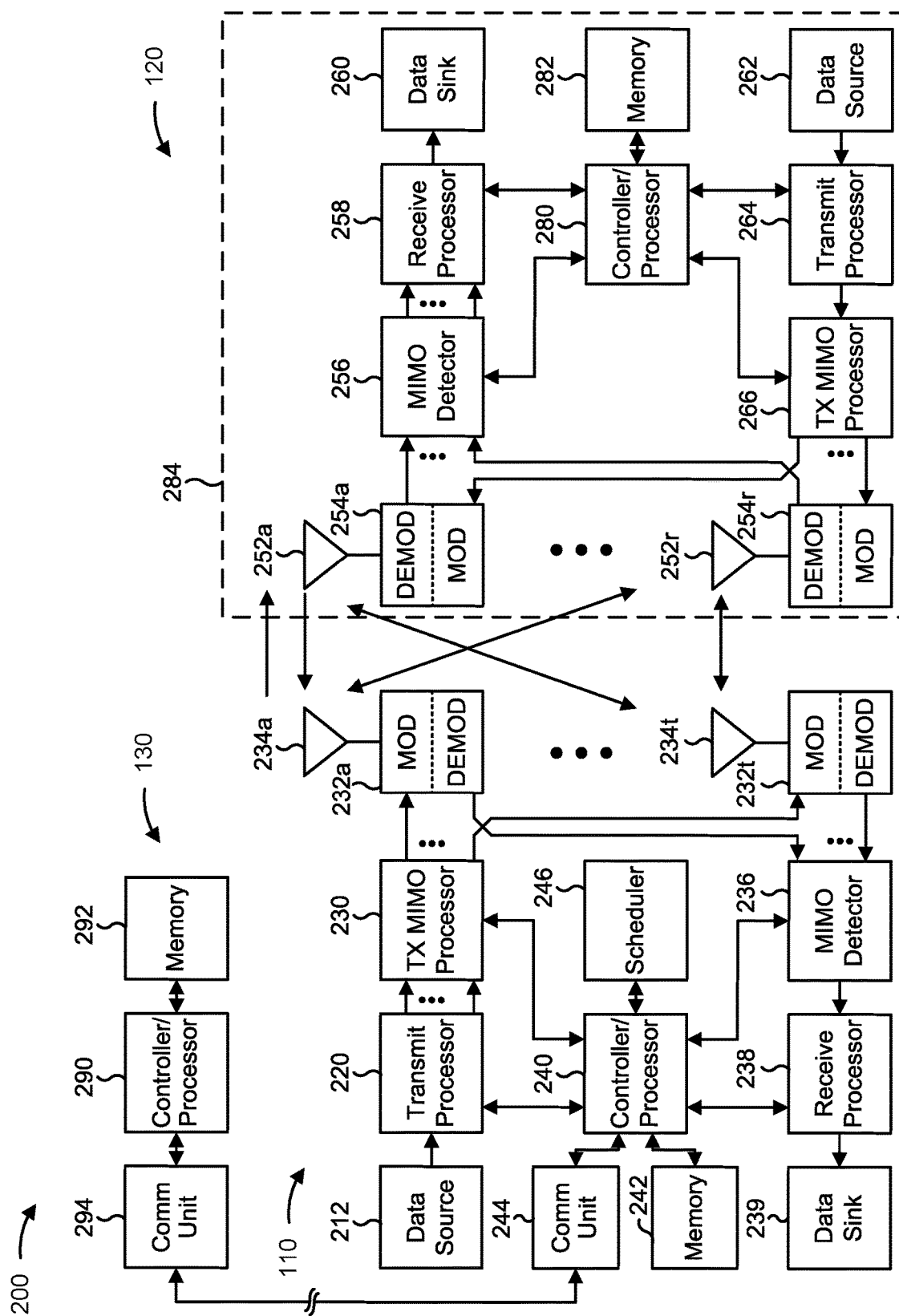
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with sidelink discovery between UEs associated with different discovery models, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, process 1400 of FIG. 14, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, process 1300 of FIG. 13, process 1400 of FIG. 14, and/or other processes as described herein. In some aspects, executing instructions may include running the instructions, converting the instructions, compiling the instructions, and/or interpreting the instructions.

In some aspects, a first UE (e.g., UE 120a) includes means for receiving, from a second UE (e.g., UE 120e) via a sidelink interface between the first UE and the second UE, an indication of a device discovery model associated with the second UE, wherein the device discovery model associated with the second UE is different than a device discovery model associated with the first UE; and/or means for performing a device discovery with the second UE based at least in part on the device discovery model associated with the second UE. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first UE includes means for receiving, from a base station, a configuration that indicates: a first set of sequences including the sequence associated with a first device discovery model, or a second set of sequences including the sequence associated with a second device discovery model.

In some aspects, the first UE includes means for determining that the device discovery model associated with the second UE is different than the device discovery model associated with the first UE.

In some aspects, a first UE (e.g., 120a) includes means for transmitting, to a second UE (e.g., 120e) via a sidelink interface between the first UE and the second UE, an indication of a device discovery model associated with the first UE, wherein a device discovery model associated with the second UE is initially different than the device discovery model associated with the first UE; and/or means for performing a device discovery with the second UE based at least in part on the device discovery model associated with the first UE.

In some aspects, the first UE includes means for selecting the sequence from a first set of sequences associated with a first device discovery model.

In some aspects, the first UE includes means for selecting the sequence from a second set of sequences associated with a second device discovery model.

In some aspects, the first UE includes means for receiving, from a base station, a configuration that indicates: a first set of sequences including the sequence associated with a first device discovery model, or a second set of sequences including the sequence associated with a second device discovery model.

In some aspects, a first UE (e.g., 120a) includes means for transmitting a beam training response sequence in a direction to a second UE (e.g., UE 120e); means for determining that a discovery request message has not been received in the direction from the second UE based at least in part on a device discovery model associated with the second UE being different than a device discovery model associated with the first UE; and/or means for performing a device discovery with the second UE based at least in part on the device discovery model associated with the second UE being different than the device discovery model associated with the first UE.

In some aspects, the first UE includes means for transmitting a discovery announcement in the direction associated with the beam training response sequence to the second UE; and/or means for monitoring a channel to receive a discovery response message from the second UE.

In some aspects, the first UE includes means for monitoring a channel to receive a discovery request message from the second UE in accordance with a timer; and/or means for transmitting a discovery announcement message in the direction associated with the beam training response sequence to the second UE based at least in part on an expiry of the timer.

In some aspects, a first UE (e.g., UE 120a) includes means for receiving a beam training response sequence in a direction from a second UE (e.g., UE 120e); means for determining that a discovery announcement message has not been received in the direction from the second UE based at least in part on a device discovery model associated with the second UE being different than a device discovery model associated with the first UE; and/or means for performing a device discovery with the second UE based at least in part on the device discovery model associated with the second UE being different than the device discovery model associated with the first UE.

In some aspects, the first UE includes means for determining that the beam training response sequence is associated with the second UE that has not been discovered by the first UE based at least in part on discovery announcement messages that have been received at the first UE.

In some aspects, the first UE includes means for transmitting a discovery request message in the direction associated with the beam training response sequence to the second UE; or means for monitoring a channel to receive a discovery response message from the second UE.

In some aspects, the first UE includes means for monitoring a channel to receive a discovery announcement message from the second UE in accordance with a timer; and/or means for transmitting a discovery request message in the direction associated with the beam training response sequence to the second UE based at least in part on an expiry of the timer.

As indicated above, FIG. 2 is provided as an example. Other examples may differ from what is described with regard to FIG. 2.

Figure 3:
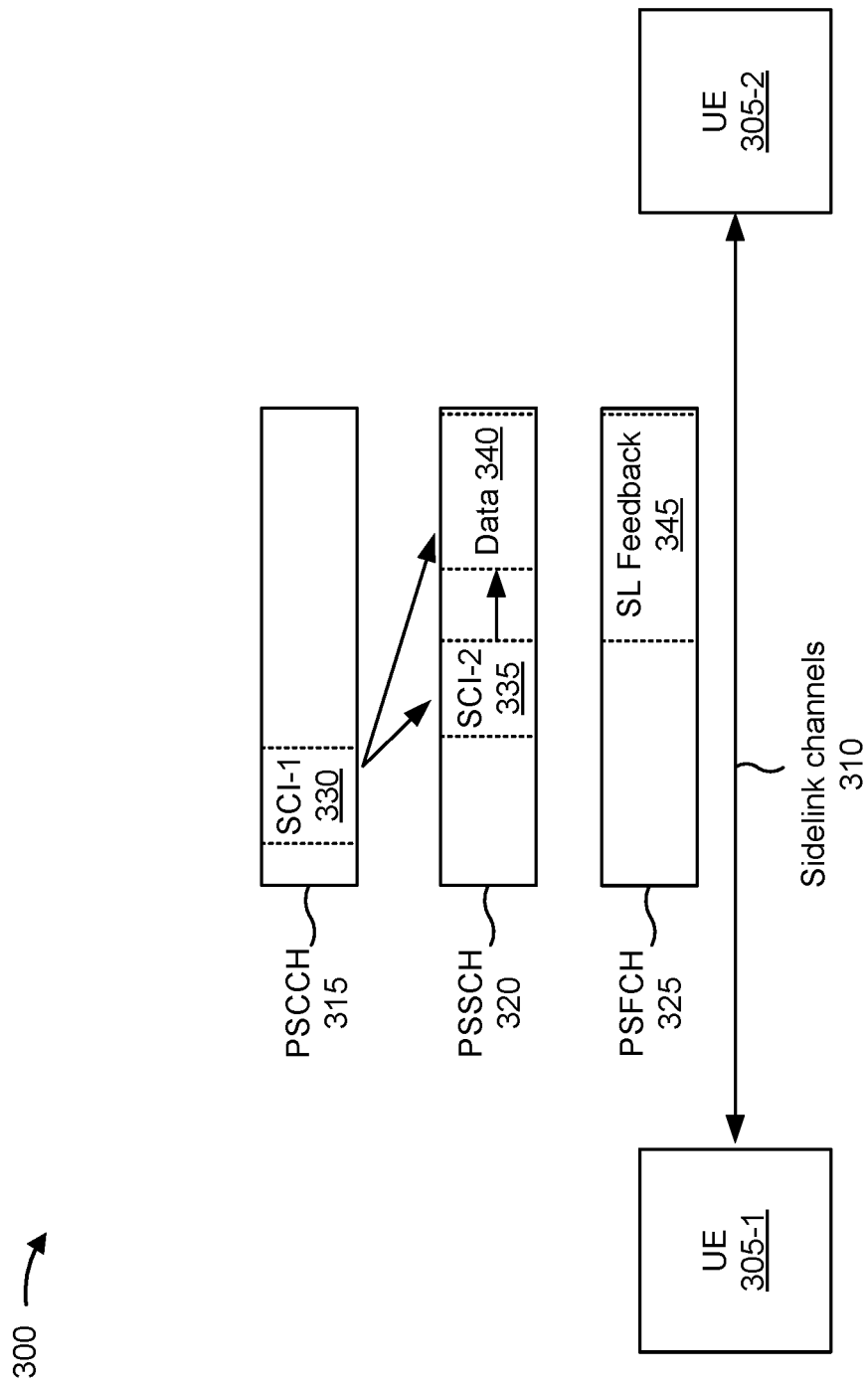
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle-to-person (V2P) communications, and/or the like), mesh networking, and/or the like. In some aspects, the UEs 305 (e.g., UE 305-1 and/or UE 305-2) may include one or more other UEs described elsewhere herein, such as UE 120. In some aspects, the one or more sidelink channels 310 may use a PC5 interface, may operate in a high frequency band (e.g., the 5.9 GHz band), may operate on an unlicensed or shared frequency band (e.g., an NR unlicensed (NR-U) frequency band), and/or the like. Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel.

The PSCCH 315 may carry sidelink control information part 1 (SCI-1) 330, which may indicate various control information used for sidelink communications. The control information may include an indication of one or more resources (e.g., time resources, frequency resources, spatial resources, and/or the like) where various types of information may be carried on the PSSCH 320, information for decoding sidelink communications on the PSSCH 320, a quality of service (QoS) priority value, a resource reservation period, a PSSCH DMRS pattern, an sidelink control information (SCI) format and a beta offset for sidelink control information part 2 (SCI-2) 335 transmitted on the PSSCH 320, and/or a number of PSSCH DMRS ports, an MCS.

The information carried on the PSSCH 320 may include the SCI-2 335 and/or data 340. The SCI-2 335 may include various types of information, such as a hybrid automatic repeat request (HARQ) process ID, a new data indicator (NDI) associated with the data 340, a source identifier, a destination identifier, a channel state information (CSI) report trigger, and/or the like. In some aspects, a UE 305 may transmit both the SCI-1 330 and the SCI-2 335. In some aspects, a UE 305 may transmit only SCI-1 330, in which case one or more types of the information that would otherwise be transmitted in the SCI-2 335 may be transmitted in the SCI-1 330 instead.

The PSFCH 325 may be used to communicate sidelink feedback 345, such as HARQ feedback (e.g., acknowledgement or negative acknowledgement (ACK/NACK) information), transmit power control (TPC), a scheduling request (SR), and/or the like.

As indicated above, FIG. 3 is provided as an example. Other examples may differ from what is described with respect to FIG. 3.

Figure 4:
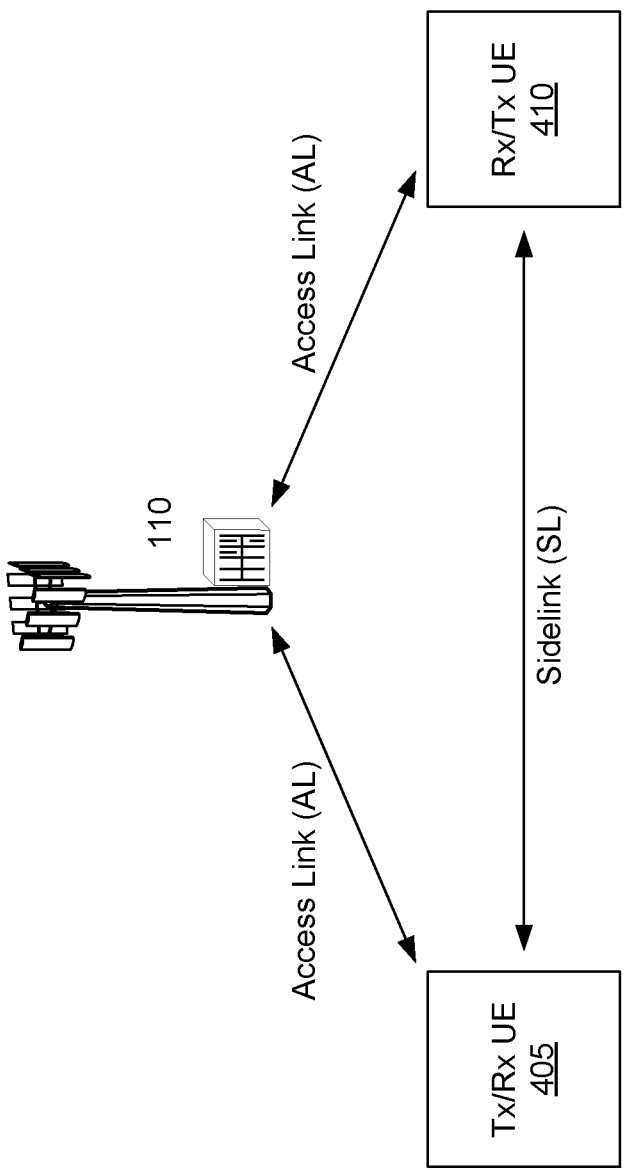
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a Tx/Rx UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
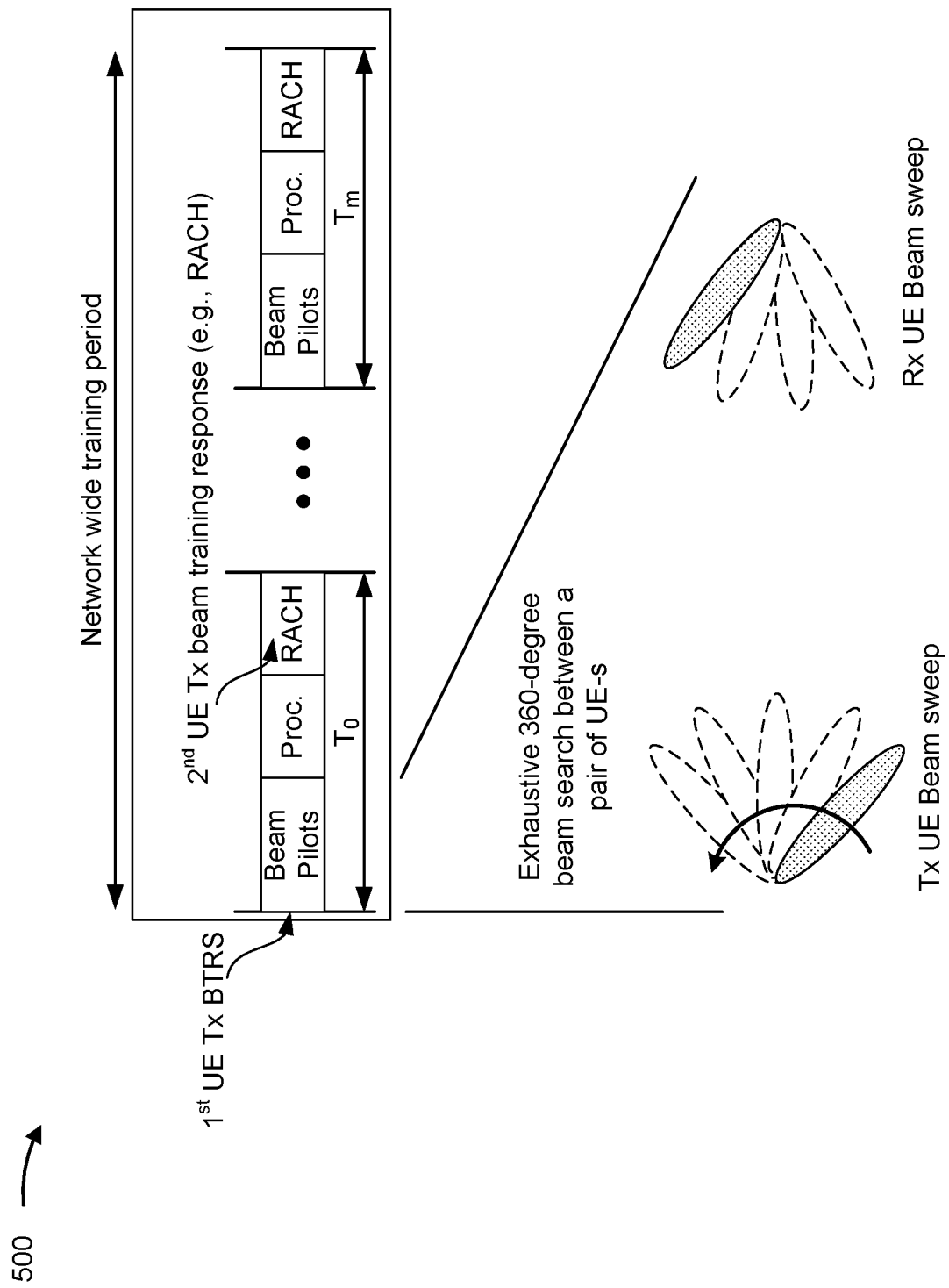
FIG. 5 is a diagram illustrating an example of a beam training, in accordance with the present disclosure.

FIG. 5 is a diagram illustrating an example of a beam training, in accordance with the present disclosure.

As shown in FIG. 5, during a beam training procedure in FR2, a Tx UE may transmit beam pilot signals in a network. The beam pilot signals may be beam training reference signals (BT-RSs). The Tx UE may transmit the beam pilot signals during a network-wide training period. The Tx UE may transmit the beam pilot signals over 360 degrees, and another Rx UE in the network may perform an Rx beam sweep. In other words, the Tx UE may perform a Tx UE beam sweep, and an Rx UE may perform an Rx UE beam sweep, thereby resulting in an exhaustive 360-degree beam search between the pair of Tx and Rx UEs. After the Rx beam sweep is performed, the Rx UE may determine a dominant direction for one or more beam pilot signals received from the Tx UE (e.g., every BT-RS sequence received at the Rx UE). The dominant direction may correspond to a beam pilot signal that is received with a higher power level as compared to other beam pilot signals. The Rx UE may process the one or more beam pilot signals and may transmit a beam training response sequence, such as a random access channel (RACH) sequence, in the dominant direction. For example, a first UE Tx BT-RS and a second UE Tx RACH may occur, being separated by a processing time. The Tx UE and the Rx UE may have information on beam directions based at least in part on the Tx UE beam sweep and the Rx UE beam sweep, and then the Tx and Rx UEs may discover each other by associating a beam pair link (BPL) to a peer UE.

As indicated above, FIG. 5 is provided as an example. Other examples may differ from what is described with respect to FIG. 5.

For sidelink communications over FR2, FR2 links may use beamforming to allow sidelink communications over a given range, due to a relatively high pathloss. Beam search and periodic beam training may be used to maintain the FR2 links. Sidelink communications allow for device-to-device communication, with or without assistance from a base station. Further, sidelink networks may be distributed, such that each device may maintain communication links with multiple peer devices. For example, a UE may maintain sidelink communication links with multiple other UEs.

Sidelink communication over FR2, or a millimeter (mmWave) band, may be different than communication for cellular applications. For example, for cellular communications, a UE may form a beam pair link with one or more base stations. For sidelink communications, UEs may create and monitor multiple beam pair links with other UEs.

For distributed sidelink communication over FR2, network-wide periodic resources may be semi-statically configured for beam search and training. UEs may transmit BT-RSs over the network-wide periodic resources associated with beam training occasions. UEs that detect the BT-RSs may transmit a feedback, such as a RACH message, on a dominant beam associated with one of the BT-RSs. In other words, a UE may determine a dominant beam associated with one of the BT-RSs, and the UE may transmit a RACH message based at least in part on the dominant beam. The UEs may receive the BT-RSs and transmit the RACH messages as part of an exhaustive beam search performed by Tx UEs and Rx UEs.

A pair of UEs may perform an FR1 device discovery after a possible beam pair link is established based at least in part on the exhaustive beam search. The UEs may perform the FR1 device discovery to determine UE identifiers (IDs), such as layer 2 IDs, for FR1 operations (e.g., sub-6 GHz band operations). An FR2 device discovery between the UEs may be different than the FR1 device discovery.

For FR2 communications, UEs may perform a device discovery using a first model of device discovery (e.g., Model A discovery in FR2) or a second model of device discovery (e.g., Model B discovery in FR2).

In the first model of device discovery, UEs transmitting RACH messages during beam training may subsequently transmit discovery announcements indicating a presence of the UEs. The discovery announcements may be transmitted in directions corresponding to directions in which the RACH messages were previously transmitted by the UEs. Further, the UEs transmitting BT-RSs during the beam training may monitor the directions in which the UEs previously received the RACH messages and may transmit discovery response messages based at least in part on a receipt of the discovery announcements in the directions on which the RACH messages were previously received. In other words, the UEs transmitting the BT-RSs may be monitoring UEs.

For example, in the first model of device discovery, a first UE may transmit BT-RSs to a second UE. The first UE may receive a RACH message from the second UE in a given direction. The first UE may receive a discovery announcement from the second UE in the given direction. The first UE, after receiving the RACH message and the discovery announcement from the second UE in the given direction, may determine an interest in a service provided by the second UE. The first UE may transmit a discovery response message to the second UE, which may enable sidelink communications to occur between the first UE and the second UE.

In the second model of device discovery, UEs transmitting BT-RSs during beam training may also transmit discovery request messages in directions in which the UEs previously received RACH messages. The UEs transmitting the RACH messages may monitor channels for the discovery request messages and may transmit discovery response messages based at least in part on the discovery request messages. In other words, the UEs transmitting the BT-RSs may be discoverer UEs, and the UEs transmitting the RACH messages may be discovered UEs.

For example, in the second model of device discovery, a first UE may transmit BT-RSs to a second UE. The first UE may receive a RACH message from the second UE in a given direction. The first UE may transmit a discovery request message in the given direction to the second UE. In other words, the first UE may transmit the discovery request message in a same direction associated with a receipt of the RACH message from the second UE. The second UE, after transmitting the RACH message, may monitor a channel for the discovery request message transmitted by the first UE. The second UE may detect the discovery request message, and the second UE may transmit a discovery response message to the first UE based at least in part on a receipt of the discovery request message. The transmission of the discovery response message may enable sidelink communications to occur between the first UE and the second UE.

In the first model of device discovery, the first UE may transmit the BT-RSs to the second UE, and the second UE may transmit the RACH message and the discovery announcement to the first UE. On the other hand, in the second model of device discovery, the first UE may transmit the BT-RSs to the second UE, the second UE may transmit the RACH message to the first UE, and the first UE may transmit the discovery request message to the second UE.

FR2 discovery messages, such as discovery request messages and discovery response messages, may be transmitted based at least in part on a PSSCH transmission scheme. No separate system-wide resources may be reserved for the FR2 discovery messages. Further, the FR2 discovery messages may include both device information and application information, enabling unnecessary links to be torn down faster, as beam formed discovery may have increased signaling overhead as compared to non-beam formed discovery.

Figure 6:
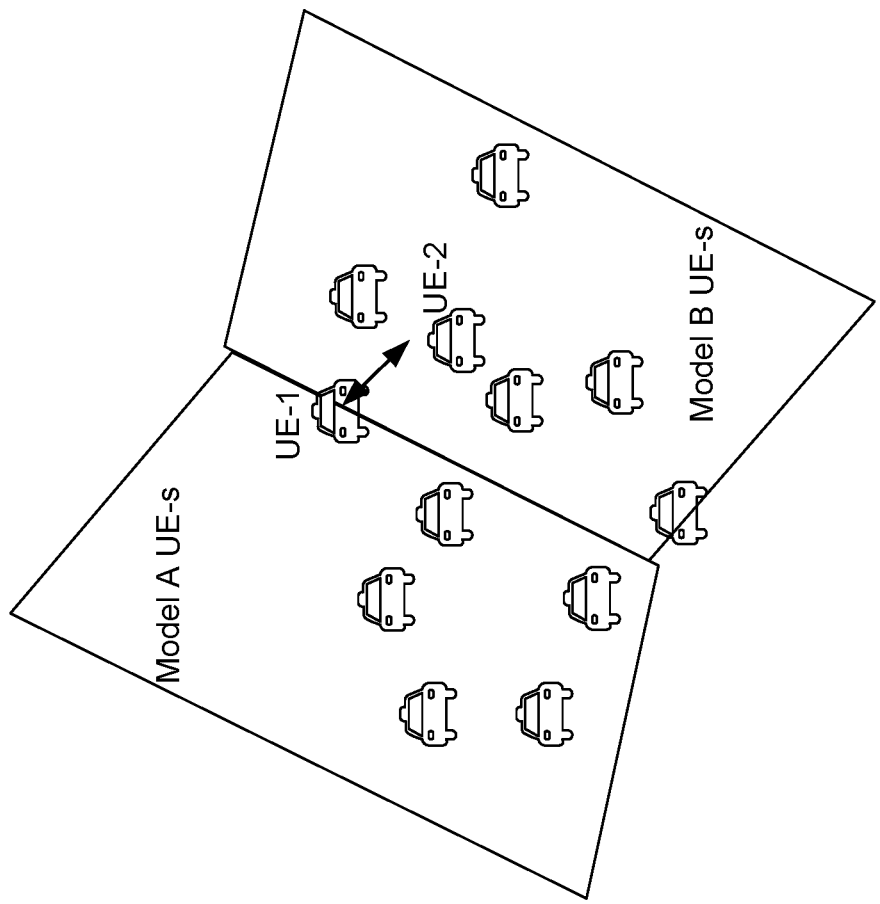
FIG. 6 is a diagram illustrating an example of a plurality of UEs using different discovery models, in accordance with the present disclosure.

FIG. 6 is a diagram illustrating an example 600 of a plurality of UEs using different discovery models, in accordance with the present disclosure.

As shown in FIG. 6, two UEs attempting to communicate over a sidelink interface may be using different device discovery models. For example, a first UE (UE-1) may attempt to communicate with a second UE (UE-2) over a sidelink interface. The first UE may use the first model of device discovery (e.g., Model A discovery in FR2), and the second UE may use the second model of device discovery (e.g., Model B discovery in FR2), or vice versa. The discovery model used by a given UE may be based at least in part on a UE configuration.

As indicated above, FIG. 6 is provided as an example. Other examples may differ from what is described with respect to FIG. 6.

As an example, a first UE may be configured to perform Model A discovery in FR2, and a second UE may be configured to perform Model B discovery in FR2. The first UE may transmit BT-RSs, and the second UE may transmit a RACH message in a dominant direction associated with one of the BT-RSs. The first UE, operating under Model A discovery in FR2, may expect a discovery announcement from the second UE based at least in part on a receipt of the RACH message from the second UE. On the other hand, the second UE, operating under Model B discovery in FR2, may expect a discovery request message from the first UE based at least in part on a transmission of the RACH message to the first UE. As a result, both the first UE and the second UE may be listening on a channel for a message from the other UE, and a discovery between the first UE and the second UE may not occur. The discovery may not occur even when channel conditions between the first UE and the second UE are favorable and applications/services of the first UE are of interest to the second UE and vice versa. The lack of FR2 discovery between the first UE and the second UE may be based at least in part on different discovery models being used by the two UEs, and the first UE not having information of a discovery model being used by the second UE and vice versa.

In various aspects of techniques and apparatuses described herein, sidelink UEs operating under different discovery models may still discovery each other. In some aspects, a first UE may receive, from a second UE, an indication (e.g., a BT-RS sequence or a beam training response sequence, such as a RACH sequence) that indicates a device discovery model associated with the second UE. The device discovery model associated with the second UE may be different than a device discovery model associated with the first UE. The first UE may perform a device discovery with the second UE based at least in part on the device discovery model associated with the second UE. For example, the first UE may perform discovery transmissions with the second UE based at least in part on the device discovery model associated with the second UE, and not on the device discovery model associated with the first UE. As a result, the first UE may discover the second UE, even when the first UE and the second UE are configured to use different device discovery models.

Figure 7:
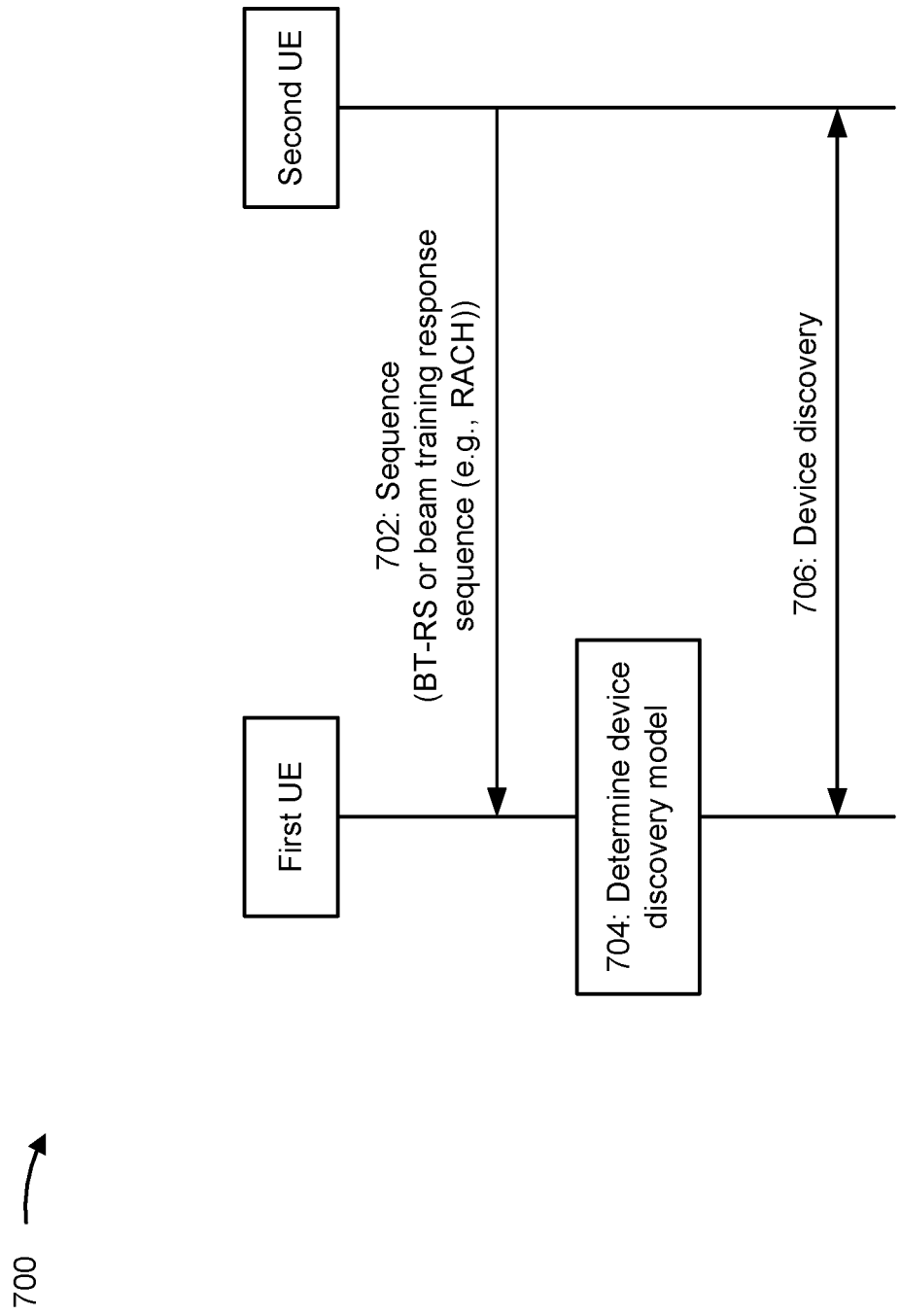
FIGS. 7-10 are diagrams illustrating examples associated with sidelink discovery between UEs associated with different discovery models, in accordance with the present disclosure.

FIG. 7 is a diagram illustrating an example 700 of sidelink discovery between UEs associated with different discovery models, in accordance with the present disclosure. As shown in FIG. 7, example 700 includes communication between a first UE (e.g., UE 120a) and a second UE (e.g., UE 120e). In some aspects, the first UE and the second UE may be included in a wireless network such as wireless network 100. In some aspects, the first UE and the second UE may communicate over a sidelink.

As shown by reference number 702, the first UE may receive, from the second UE via a sidelink interface between the first UE and the second UE, a sequence that indicates a device discovery model associated with the second UE. In some aspects, the sequence may be a BT-RS. In some aspects, the sequence may be a beam training response sequence, such as a RACH sequence. In some aspects, the sequence may be selected from a first set of sequences associated with a first device discovery model, or the sequence may be selected from a second set of sequences associated with a second device discovery model. In other words, based at least in part on which set of sequences are used to transmit the sequence, the device discovery model associated with the second UE may be indicated to the first UE.

As shown by reference number 704, the first UE may determine that the device discovery model associated with the second UE is different than the device discovery model associated with the first UE. For example, the first UE may have information indicating the device discovery model associated with the first UE, and based at least in part on the sequence indicating the device discovery model associated with the second UE, the first UE may determine that the device discovery model associated with the second UE is different than the device discovery model associated with the first UE. In other words, based at least in part on the sequence received from the second UE, the first UE may determine that the first UE and the second UE are associated with different device discovery models.

As shown by reference number 706, the first UE may perform a device discovery with the second UE based at least in part on the device discovery model associated with the second UE. In some aspects, the sequence may be a first sequence, and the first UE may perform the device discovery by transmitting a second sequence to the second UE based at least in part on the device discovery model associated with the second UE. In this example, the first sequence may be a BT-RS and the second sequence may be a beam training response sequence, such as a RACH sequence.

In some aspects, the first UE may switch from an initial device discovery model associated with the first UE to the device discovery model associated with the second UE, based at least in part on the device discovery model associated with the second UE, as indicated by the sequence received from the second UE. As a result, the first UE may use a same device discovery model as the second UE, thereby enabling a device discovery to occur between the first UE and the second UE.

In some aspects, the first UE and/or the second UE may receive, from a base station, a configuration that indicates the first set of sequences including the sequence associated with the first device discovery model, and/or the second set of sequences including the sequence associated with the second device discovery model. As a result, based at least in part on the configuration, the first UE and/or the second UE may be configured to detect an applicable device discovery model depending on which set of sequences are used to transmit the sequence.

As indicated above, FIG. 7 is provided as an example. Other examples may differ from what is described with respect to FIG. 7.

Figure 8:
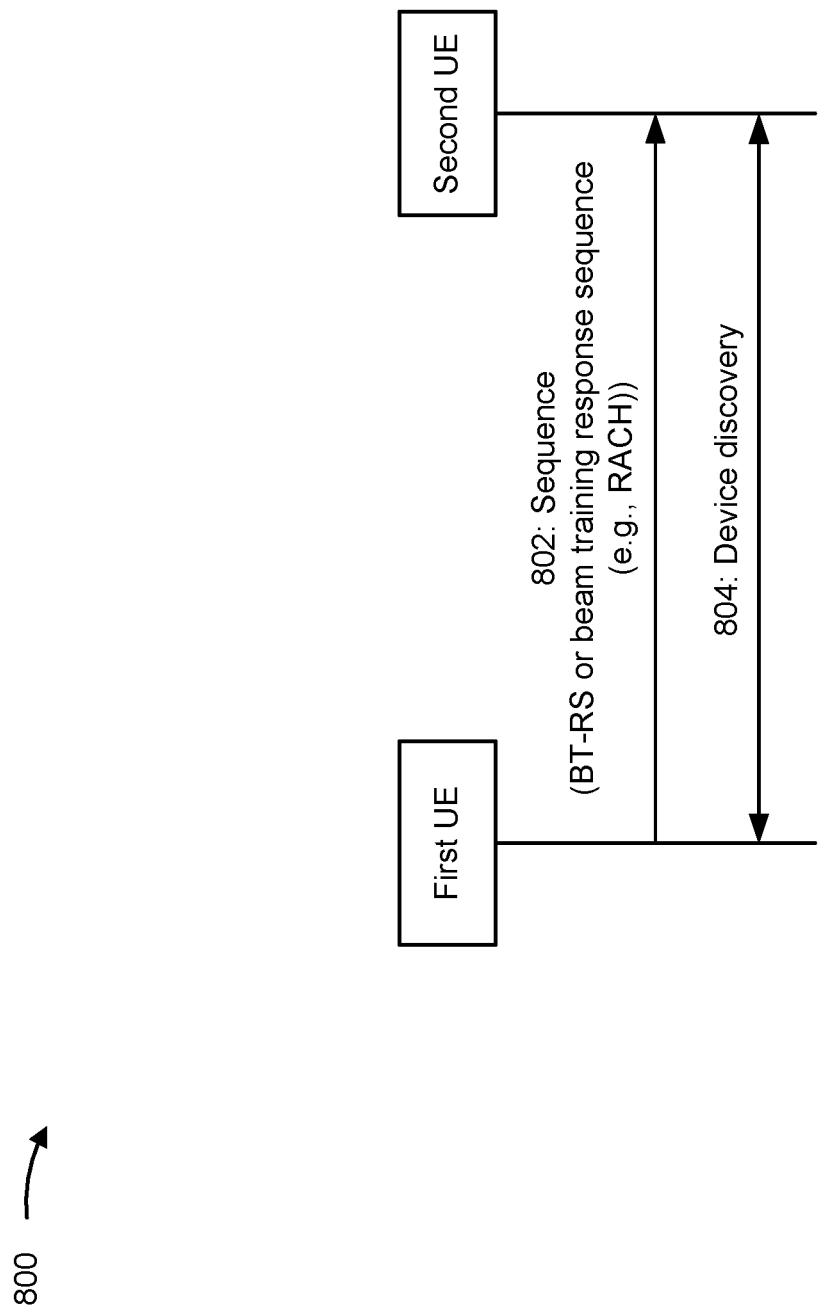

FIG. 8 is a diagram illustrating an example 800 of sidelink discovery between UEs associated with different discovery models, in accordance with the present disclosure. As shown in FIG. 8, example 800 includes communication between a first UE (e.g., UE 120*a*) and a second UE (e.g., UE 120*e*). In some aspects, the first UE and the second UE may be included in a wireless network such as wireless network 100. In some aspects, the first UE and the second UE may communicate over a sidelink.

As shown by reference number 802, the first UE may transmit, to the second UE via a sidelink interface between the first UE and the second UE, a sequence that indicates a device discovery model associated with the first UE. In some aspects, the sequence may be a BT-RS. In some aspects, the sequence may be a beam training response sequence, such as a RACH sequence.

In some aspects, the first UE may select the sequence from a first set of sequences associated with a first device discovery model. Alternatively, the first UE may select the sequence from a second set of sequences associated with a second device discovery model. In other words, the first UE may select the sequence from a given set of sequences based at least in part on the device discovery model associated with the first UE.

In some aspects, the first UE may receive, from a base station, a configuration that indicates the first set of sequences associated with the first device discovery model, and/or a second set of sequences associated with the second device discovery model, which may enable the first UE to select the sequence from the first set of sequences or the second set of sequences depending on the device discovery model associated with the first UE.

As shown by reference number 804, the first UE may perform a device discovery with the second UE based at least in part on the device discovery model associated with the first UE. In some aspects, the sequence may be a first sequence, and the first UE may perform the device discovery by receiving a second sequence to the second UE based at least in part on the device discovery model associated with the second UE. In this example, the first sequence may be a BT-RS and the second sequence may be a beam training response sequence, such as a RACH sequence.

In some aspects, the first UE may perform the device discovery with the second UE based at least in part on the device discovery model associated with the first UE, irrespective of a device discovery model associated with the second UE. For example, the device discovery model associated with the second UE may initially be different than the device discovery model associated with the first UE, but the second UE may switch from an initial device discovery model to the device discovery model associated with the first UE, based at least in part on the device discovery model associated with the first UE, as indicated by the sequence transmitted to the second UE.

As indicated above, FIG. 8 is provided as an example. Other examples may differ from what is described with respect to FIG. 8.

In some aspects, a sequence-based approach may be used to indicate configured discovery models to UEs. In the sequence-based approach, a BT-RS sequence or a beam training response sequence may indicate the configured discovery model.

In some aspects, a UE transmitting the BT-RS may select a BT-RS sequence from a first set of BT-RS sequences based at least in part on the UE being configured to perform device discovery using a first device discovery model. Alternatively, the UE transmitting the BT-RS may select a BT-RS sequence from a second set of BT-RS sequences based at least in part on the UE being configured to perform device discovery using a second device discovery model. The first set of BT-RS sequences may be mutually exclusive from the second set of BT-RS sequences. In some aspects, the two sets of BT-RS sequences may be pre-configured for the UE or may be configured by a base station for the UE.

In some aspects, a UE transmitting a RACH sequence after decoding a BT-RS may select a RACH sequence from a first set of RACH sequences based at least in part on the UE being configured to perform device discovery using a first device discovery model. Alternatively, the UE transmitting the RACH may select a RACH sequence from a second set of RACH sequences based at least in part on the UE being configured to perform device discovery using a second device discovery model. The first set of RACH sequences may be mutually exclusive from the second set of RACH sequences. In some aspects, the two sets of RACH sequences may be pre-configured for the UE or may be configured by the base station for the UE.

In some aspects, a UE may determine that a peer UE is configured to use a different device discovery model based at least in part on a BT-RS sequence or a beam training response sequence. In some aspects, with respect to the BT-RS sequence, the UE transmitting a beam training response sequence may modify a used device discovery model to match a device discovery model of the peer UE, as indicated by the BT-RS sequence, for a specific link. In some aspects, with respect to the beam training response sequence, a UE transmitting the BT-RS and receiving a beam training response sequence may modify a used device discovery model to match a device discovery model of the peer UE, as indicated by the beam training response sequence, for a specific link.

Figure 9:
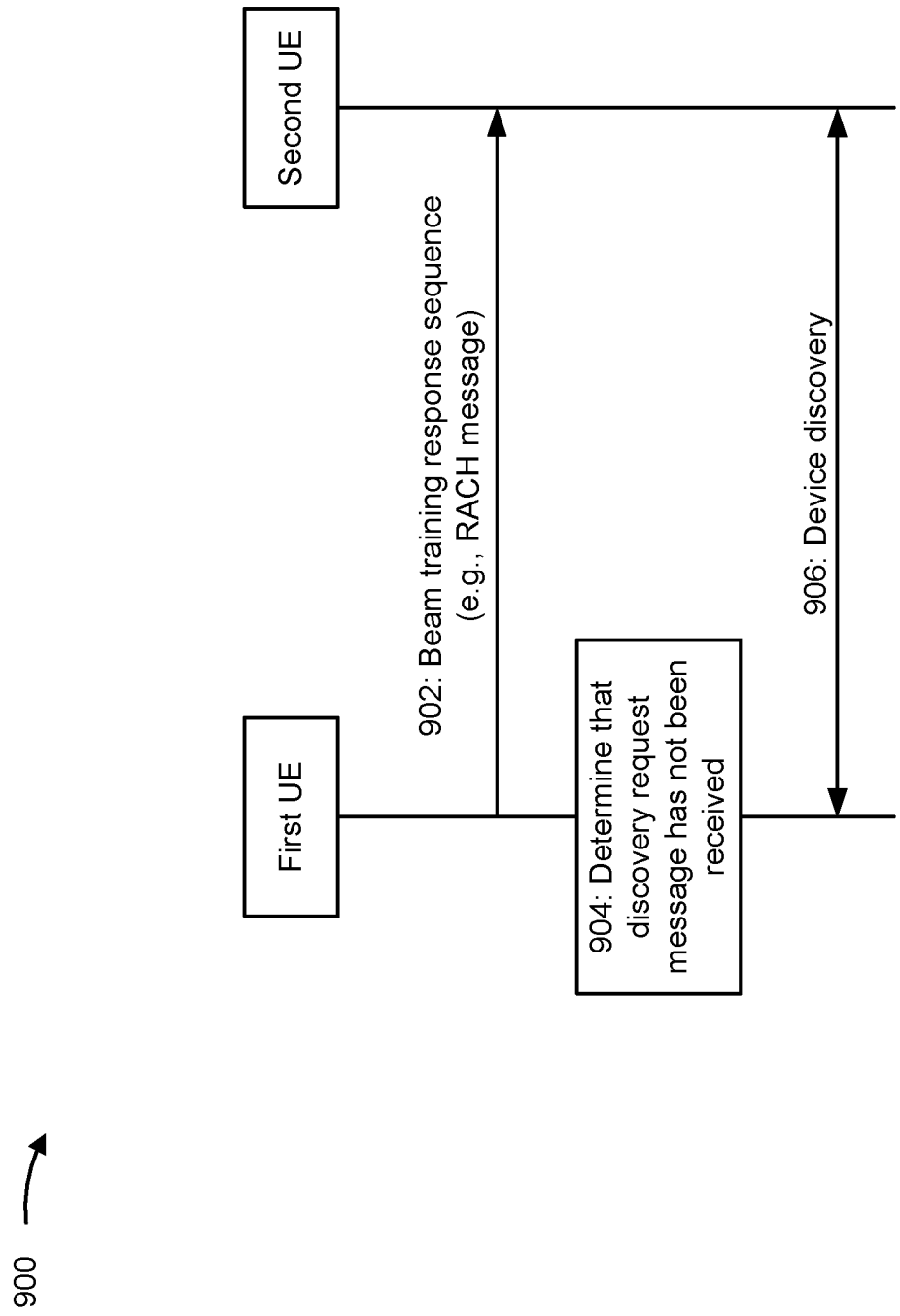

FIG. 9 is a diagram illustrating an example 900 of sidelink discovery between UEs associated with different discovery models, in accordance with the present disclosure. As shown in FIG. 9, example 900 includes communication between a first UE (e.g., UE 120a) and a second UE (e.g., UE 120e). In some aspects, the first UE and the second UE may be included in a wireless network such as wireless network 100. In some aspects, the first UE and the second UE may communicate over a sidelink.

As shown by reference number 902, the first UE may transmit a beam training response sequence in a direction to the second UE. The first UE may transmit the beam training response sequence based at least in part on a BT-RS received from the second UE. The beam training response sequence may be a RACH message.

As shown by reference number 904, the first UE may determine that a discovery request message has not been received in the direction from the second UE. The discovery request message may not be received based at least in part on a device discovery model associated with the second UE being different than a device discovery model associated with the first UE. For example, the first UE may be associated with a first device discovery model, and the second UE may be associated with a second device discovery model.

As shown by reference number 906, the first UE may perform a device discovery with the second UE based at least in part on the device discovery model associated with the second UE being different than the device discovery model associated with the first UE. In some aspects, the first UE may perform the device discovery by transmitting a discovery announcement in the direction associated with the beam training response sequence to the second UE, and by monitoring a channel to receive a discovery response message from the second UE. In some aspects, the first UE may perform the device discovery by monitoring a channel to receive a discovery request message from the second UE in accordance with a timer, and by transmitting a discovery announcement message in the direction associated with the beam training response sequence to the second UE based at least in part on an expiry of the timer.

In some aspects, the first UE may perform the device discovery based at least in part on a device discovery model associated with the first UE. For example, the first UE may transmit discovery announcement messages to the second UE, and discovery request messages may not be received from the second UE in the direction associated with the beam training response sequence.

In some aspects, the first UE may perform the device discovery based at least in part on a device discovery model associated with the second UE. For example, the first UE may stop a transmission of discovery announcement messages and monitor a channel to listen for discovery request messages from the second UE.

As indicated above, FIG. 9 is provided as an example. Other examples may differ from what is described with respect to FIG. 9.

Figure 10:
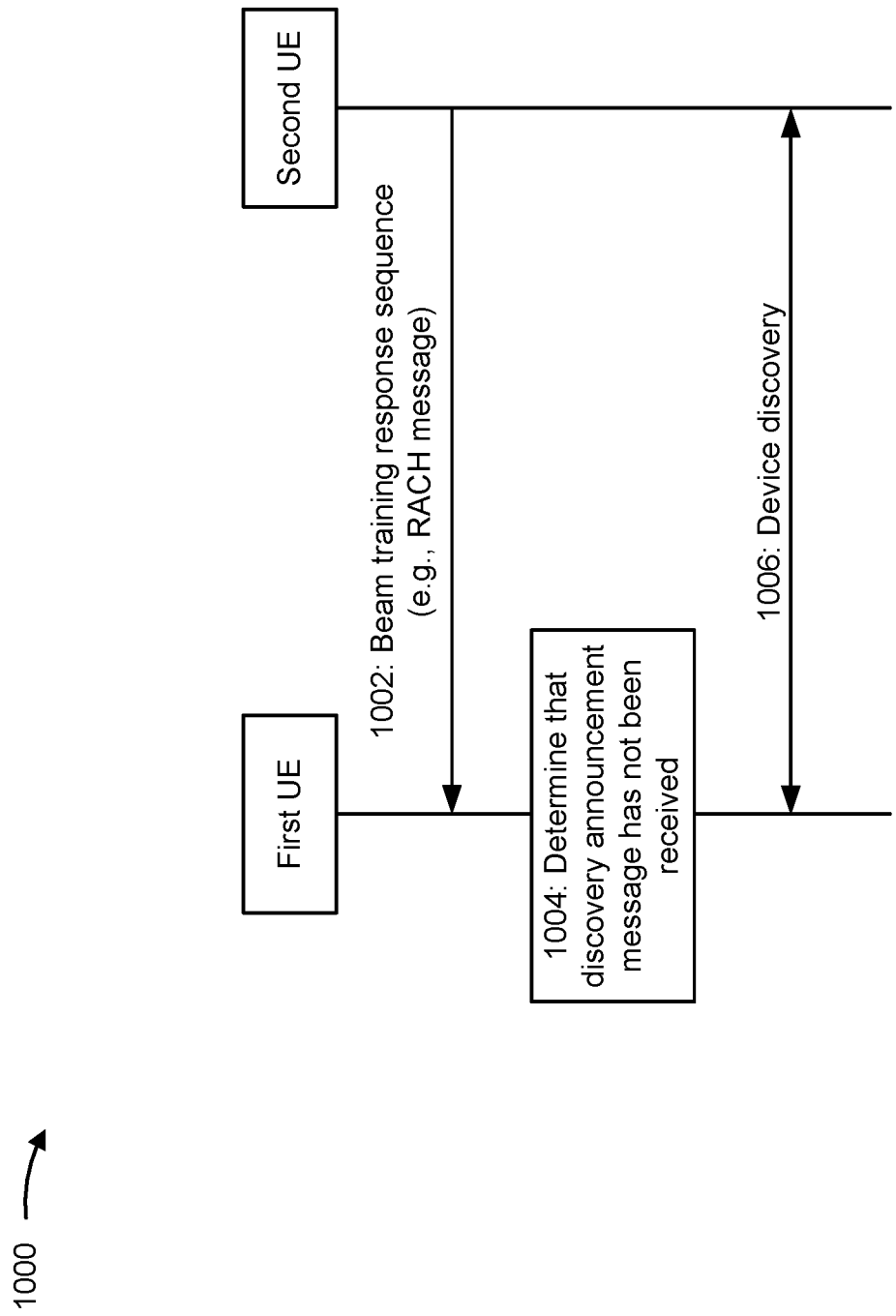

FIG. 10 is a diagram illustrating an example 900 of sidelink discovery between UEs associated with different discovery models, in accordance with the present disclosure. As shown in FIG. 10, example 1000 includes communication between a first UE (e.g., UE 120a) and a second UE (e.g., UE 120e). In some aspects, the first UE and the second UE may be included in a wireless network such as wireless network 100. In some aspects, the first UE and the second UE may communicate over a sidelink.

As shown by reference number 1002, the first UE may receive a beam training response sequence in a direction from the second UE. The first UE may receive the beam training response sequence based at least in part on a BT-RS that was previously transmitted from the first UE to the second UE. The beam training response sequence may be a RACH message.

As shown by reference number 1004, the first UE may determine that a discovery announcement message has not been received in the direction from the second UE. The discovery announcement message may not be received based at least in part on a device discovery model associated with the second UE being different than a device discovery model associated with the first UE. For example, the first UE may be associated with a first device discovery model, and the second UE may be associated with a second device discovery model.

In some aspects, the first UE may determine that the beam training response sequence is associated with the second UE that has not been discovered by the first UE based at least in part on discovery announcement messages that have been received at the first UE. For example, the first UE may receive discovery announcement messages from other UEs, and based at least in part on these discovery announcement messages, the first UE may determine that the beam training response sequence is from a different undiscovered UE.

As shown by reference number 1006, the first UE may perform a device discovery with the second UE based at least in part on the device discovery model associated with the second UE being different than the device discovery model associated with the first UE. In some aspects, the first UE may perform the device discovery by transmitting a discovery request message in the direction associated with the beam training response sequence to the second UE, and by monitoring a channel to receive a discovery response message from the second UE. In some aspects, the first UE may perform the device discovery by monitoring a channel to receive a discovery announcement message from the second UE in accordance with a timer, and by transmitting a discovery request message in the direction associated with the beam training response sequence to the second UE based at least in part on an expiry of the timer.

In some aspects, the first UE may perform the device discovery based at least in part on a device discovery model associated with the first UE. For example, the first UE may stop a transmission of discovery request messages in the direction associated with the beam training response sequence and monitor a channel to listen for discovery announcement messages from the second UE. In some aspects, the first UE may perform the device discovery based at least in part on a device discovery model associated with the second UE. For example, the first UE may transmit discovery request messages to the second UE.

As indicated above, FIG. 10 is provided as an example. Other examples may differ from what is described with respect to FIG. 10.

In some aspects, a message-based approach may be used to resolve a discrepancy between configured discovery models for UEs. The message-based approach to resolve the discrepancy between the configured discovery models for the UEs may be employed based at least in part on a UE pre-configuration or default configuration.

In some aspects, after beam training, a UE may perform a discovery process based at least in part on a configured discovery model for that UE. During the discovery process, the UE may transmit or receive a beam training response sequence in one or more directions. The UE may determine that no discovery request message or discovery announcement message has been received in the one or more directions corresponding to the beam training response sequence. Further, the UE may determine that the beam training response sequence is associated with an undiscovered UE based at least in part on peer UEs that have been discovered by the UE. In other words, based at least in part on the peer UEs that have been discovered, the UE may determine that the beam training response sequence is from a different, undiscovered UE. For example, the UE may determine that the beam training response sequence does not correspond to information include in discovery request messages and/or discovery response messages from discovered peer UEs.

In some aspects, a first UE configured for a first device discovery model may transmit a BT-RS, and a second UE configured for a second device discovery model may transmit a beam training response sequence.

In some aspects, the first UE may determine that no discovery request message or discovery announcement message has been received, and the first UE may transmit discovery request messages in the one or more directions corresponding to the beam training response sequence. The first UE may be a RACH recipient. The first UE may wait for a discovery response message from the second UE. Alternatively, the first UE may start a timer and monitor a channel for discovery announcement messages from the second UE. After the timer expires, the first UE may transmit discovery request messages in the one or more directions corresponding to the beam training response sequence.

In some aspects, the second UE may transmit discovery announcement messages in the one or more directions corresponding to the beam training response sequence. The second UE may wait for a discovery response message from the first UE. Alternatively, the second UE may start a timer and monitor a channel for discovery request messages from the first UE. After the timer expires, the second UE may transmit discovery announcement messages in the one or more directions corresponding to the beam training response sequence.

In some aspects, a first UE configured for a second device discovery model may transmit a BT-RS, and a second UE configured for a first device discovery model may transmit a beam training response sequence. In some aspects, the first UE may determine that no discovery request message or discovery announcement message has been received, and the first UE and the second UE may use the first device discovery model. For example, the first UE may stop transmitting discovery request messages in the one or more directions associated with the beam training response sequence, and may monitor a channel to listen for discovery announcement messages from the second UE. Further, the second UE may continue transmitting the discovery announcement messages to the first UE. In some aspects, the first UE may determine that no discovery request message or discovery announcement message has been received, and the first UE and the second UE may use the second device discovery model. For example, the second UE may stop transmitting discovery announcement messages, and may monitor a channel to listen for discovery request messages from the first UE.

Figure 11:
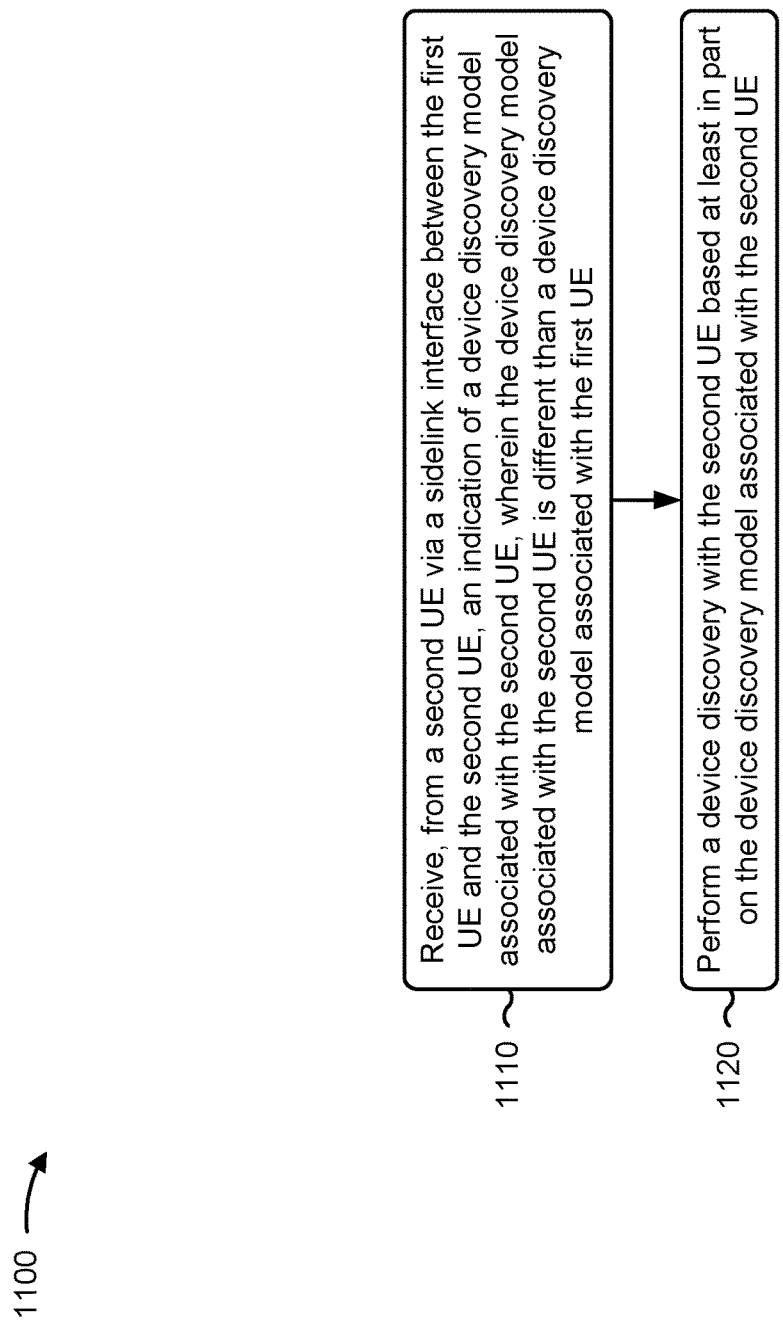
FIGS. 11-14 are diagrams illustrating example processes associated with sidelink discovery between UEs associated with different discovery models, in accordance with various aspects of the present disclosure.

FIG. 11 is a diagram illustrating an example process 1100 performed, for example, by a first UE, in accordance with various aspects of the present disclosure. Example process 1100 is an example where the first UE (e.g., UE 120*a*) performs operations associated with techniques and apparatuses for sidelink discovery between UEs associated with different discovery models.

As shown in FIG. 11, in some aspects, process 1100 may include receiving, from a second UE via a sidelink interface between the first UE and the second UE, an indication of a device discovery model associated with the second UE, wherein the device discovery model associated with the second UE is different than a device discovery model associated with the first UE (block 1110). For example, the UE (e.g., using reception component 1502, depicted in FIG. 15) may receive, from a second UE via a sidelink interface between the first UE and the second UE, an indication of a device discovery model associated with the second UE, wherein the device discovery model associated with the second UE is different than a device discovery model associated with the first UE, as described above.

As further shown in FIG. 11, in some aspects, process 1100 may include performing a device discovery with the second UE based at least in part on the device discovery model associated with the second UE (block 1120). For example, the UE (e.g., using performance component 1508, depicted in FIG. 15) may perform a device discovery with the second UE based at least in part on the device discovery model associated with the second UE, as described above.

Process 1100 may include additional aspects, such as any single aspect or any combination of aspects described below and/or in connection with one or more other processes described elsewhere herein.

In a first aspect, the indication is a beam training reference signal sequence.

In a second aspect, alone or in combination with the first aspect, the indication is a beam training response sequence.

In a third aspect, alone or in combination with one or more of the first and second aspects, the indication is a sequence selected from a first set of sequences associated with a first device discovery model.

In a fourth aspect, alone or in combination with one or more of the first through third aspects, the indication is a sequence selected from a second set of sequences associated with a second device discovery model.

In a fifth aspect, alone or in combination with one or more of the first through fourth aspects, the indication is a sequence, and further comprising receiving, from a base station, a configuration that indicates a first set of sequences including the sequence associated with a first device discovery model, or a second set of sequences including the sequence associated with a second device discovery model.

In a sixth aspect, alone or in combination with one or more of the first through fifth aspects, process 1100 includes determining that the device discovery model associated with the second UE is different than the device discovery model associated with the first UE.

In a seventh aspect, alone or in combination with one or more of the first through sixth aspects, the indication is a first indication, and wherein performing the device discovery comprises transmitting a second indication to the second UE based at least in part on the device discovery model associated with the second UE, and wherein the first indication is a beam training reference signal sequence and the second indication is a beam training response sequence.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
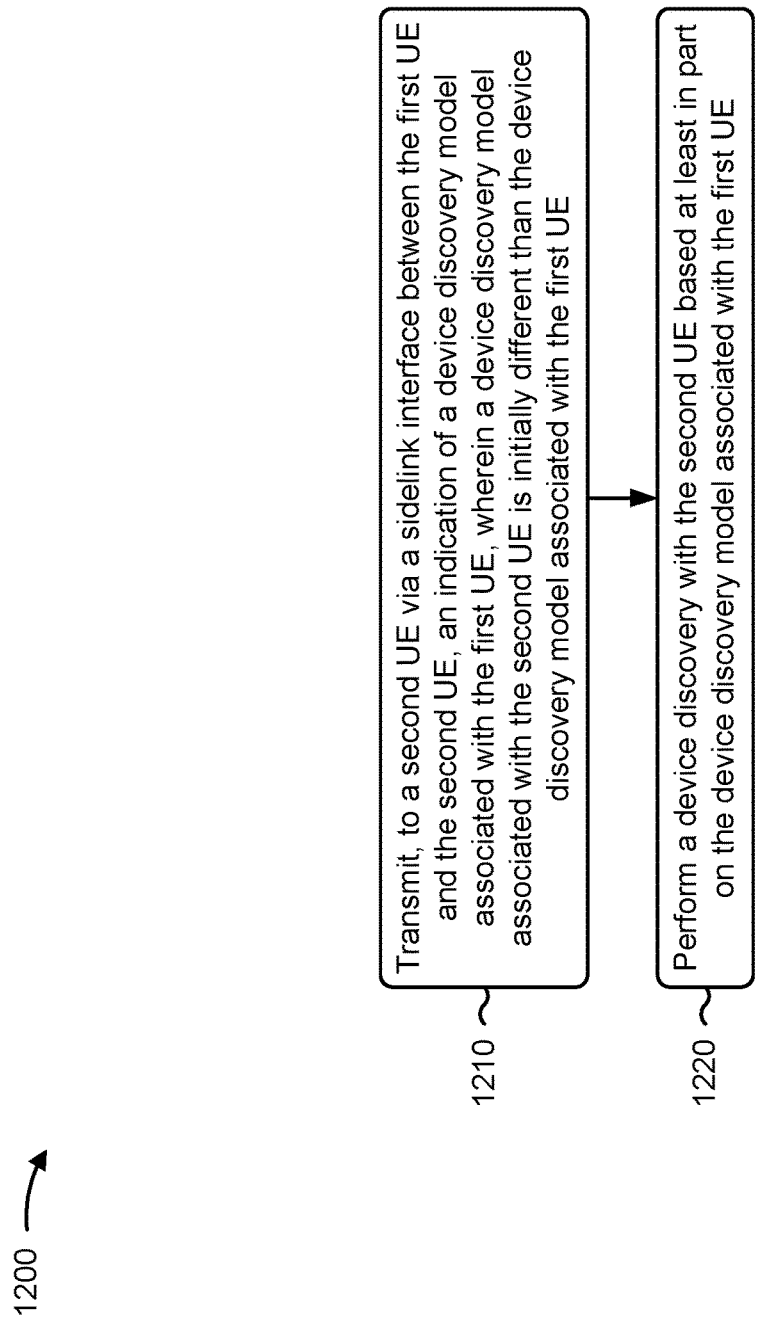

FIG. 12 is a diagram illustrating an example process 1200 performed, for example, by a UE, in accordance with various aspects of the present disclosure. Example process 1200 is an example where the first UE (e.g., UE 120a) performs operations associated with techniques and apparatuses for sidelink discovery between UEs associated with different discovery models.

As shown in FIG. 12, in some aspects, process 1200 may include transmitting, to a second UE via a sidelink interface between the first UE and the second UE, an indication of a device discovery model associated with the first UE, wherein a device discovery model associated with the second UE is initially different than the device discovery model associated with the first UE (block 1210). For example, the UE (e.g., using transmission component 1504, depicted in FIG. 15) may transmit, to a second UE via a sidelink interface between the first UE and the second UE, an indication of a device discovery model associated with the first UE, wherein a device discovery model associated with the second UE is initially different than the device discovery model associated with the first UE, as described above.

As further shown in FIG. 12, in some aspects, process 1200 may include performing a device discovery with the second UE based at least in part on the device discovery model associated with the first UE (block 1220). For example, the UE (e.g., using performance component 1508, depicted in FIG. 15) may perform a device discovery with the second UE based at least in part on the device discovery model associated with the first UE, as described above.

Process 1200 may include additional aspects, such as any single aspect or any combination of aspects described below and/or in connection with one or more other processes described elsewhere herein.

In a first aspect, the indication is a beam training reference signal sequence.

In a second aspect, alone or in combination with the first aspect, the indication is a beam training response sequence.

In a third aspect, alone or in combination with one or more of the first and second aspects, the indication is a sequence, and further comprising selecting the sequence from a first set of sequences associated with a first device discovery model.

In a fourth aspect, alone or in combination with one or more of the first through third aspects, the indication is a sequence, and further comprising selecting the sequence from a second set of sequences associated with a second device discovery model.

In a fifth aspect, alone or in combination with one or more of the first through fourth aspects, the indication is a sequence, and further comprising receiving, from a base station, a configuration that indicates a first set of sequences including the sequence associated with a first device discovery model, or a second set of sequences including the sequence associated with a second device discovery model.

In a sixth aspect, alone or in combination with one or more of the first through fifth aspects, the indication is a first indication, and wherein performing the device discovery comprises receiving a second indication to the second UE based at least in part on the device discovery model associated with the second UE, and wherein the first indication is a beam training reference signal sequence and the second indication is a beam training response sequence.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
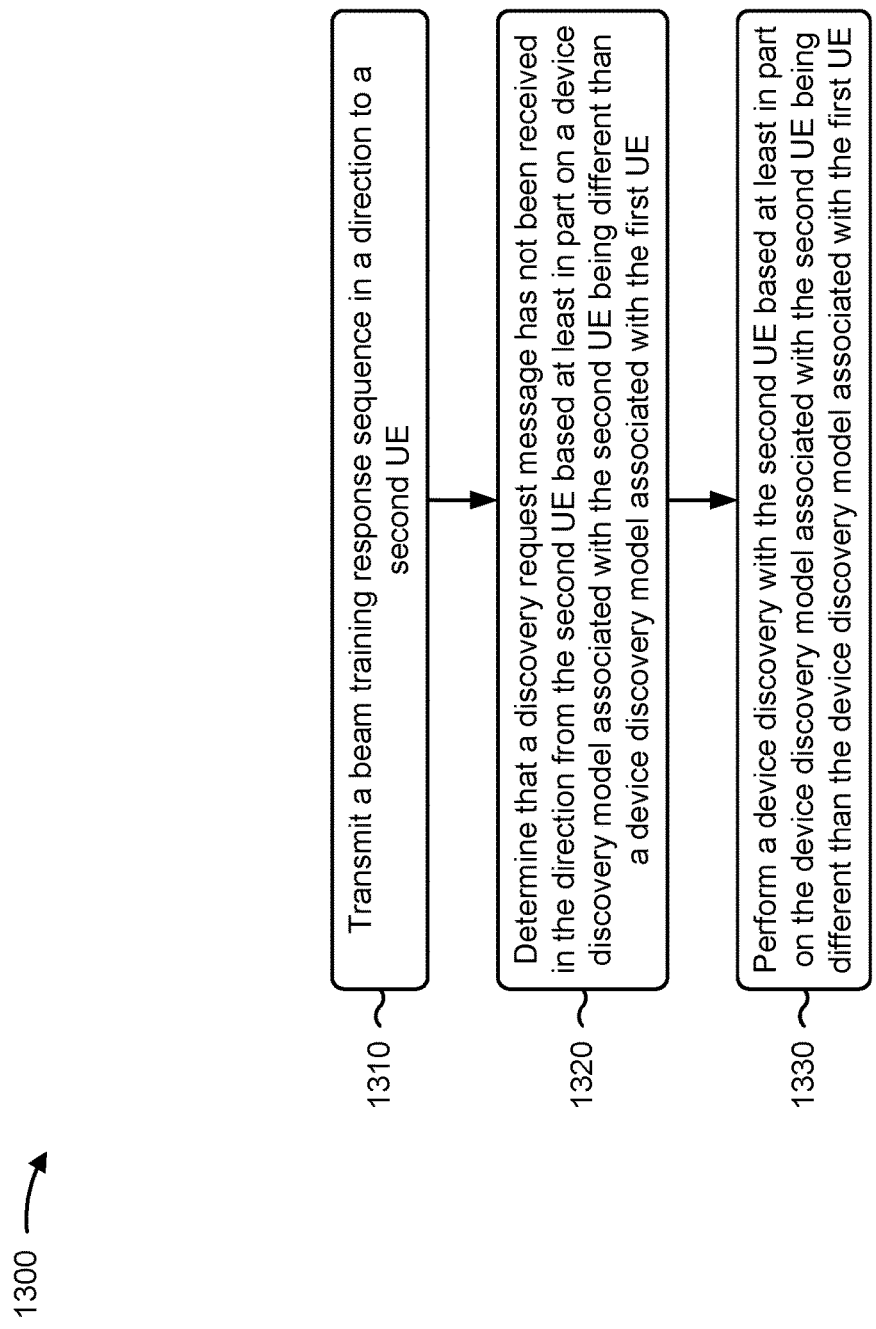

FIG. 13 is a diagram illustrating an example process 1300 performed, for example, by a UE, in accordance with various aspects of the present disclosure. Example process 1300 is an example where the first UE (e.g., UE 120a) performs operations associated with techniques and apparatuses for sidelink discovery between UEs associated with different discovery models.

As shown in FIG. 13, in some aspects, process 1300 may include transmitting a beam training response sequence in a direction to a second UE (block 1310). For example, the UE (e.g., using transmission component 1504, depicted in FIG. 15) may transmit a beam training response sequence in a direction to a second UE, as described above.

As further shown in FIG. 13, in some aspects, process 1300 may include determining that a discovery request message has not been received in the direction from the second UE based at least in part on a device discovery model associated with the second UE being different than a device discovery model associated with the first UE (block 1320). For example, the UE (e.g., using determination component 1510, depicted in FIG. 15) may determine that a discovery request message has not been received in the direction from the second UE based at least in part on a device discovery model associated with the second UE being different than a device discovery model associated with the first UE, as described above.

As further shown in FIG. 13, in some aspects, process 1300 may include performing a device discovery with the second UE based at least in part on the device discovery model associated with the second UE being different than the device discovery model associated with the first UE (block 1330). For example, the UE (e.g., using performance component 1508, depicted in FIG. 15) may perform a device discovery with the second UE based at least in part on the device discovery model associated with the second UE being different than the device discovery model associated with the first UE, as described above.

Process 1300 may include additional aspects, such as any single aspect or any combination of aspects described below and/or in connection with one or more other processes described elsewhere herein.

In a first aspect, performing the device discovery comprises transmitting a discovery announcement in the direction associated with the beam training response sequence to the second UE, and monitoring a channel to receive a discovery response message from the second UE.

In a second aspect, alone or in combination with the first aspect, performing the device discovery comprises monitoring a channel to receive a discovery request message from the second UE in accordance with a timer, and transmitting a discovery announcement message in the direction associated with the beam training response sequence to the second UE based at least in part on an expiry of the timer.

In a third aspect, alone or in combination with one or more of the first and second aspects, the first UE is associated with a first device discovery model, and the second UE is associated with a second device discovery model.

In a fourth aspect, alone or in combination with one or more of the first through third aspects, performing the device discovery comprises performing the device discovery based at least in part on a device discovery model associated with the first UE.

In a fifth aspect, alone or in combination with one or more of the first through fourth aspects, performing the device discovery based at least in part on the device discovery model associated with the first UE further comprises transmitting discovery announcement messages to the second UE, and wherein discovery request messages are not received from the second UE in the direction associated with the beam training response sequence.

In a sixth aspect, alone or in combination with one or more of the first through fifth aspects, performing the device discovery comprises performing the device discovery based at least in part on a device discovery model associated with the second UE.

In a seventh aspect, alone or in combination with one or more of the first through sixth aspects, performing the device discovery based at least in part on the device discovery model associated with the second UE further comprises stopping a transmission of discovery announcement messages and monitoring a channel to listen for discovery request messages from the second UE.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
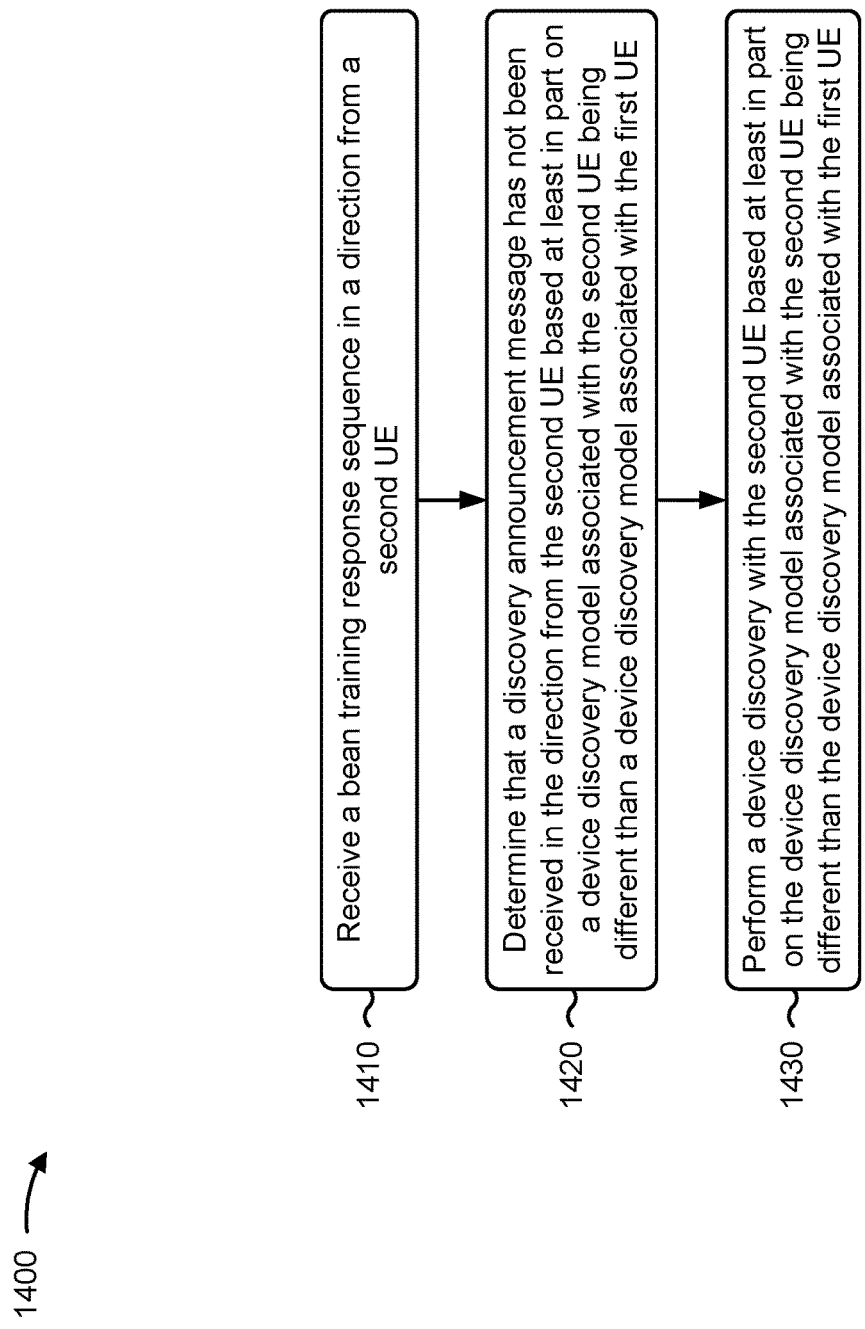

FIG. 14 is a diagram illustrating an example process 1400 performed, for example, by a UE, in accordance with various aspects of the present disclosure. Example process 1400 is an example where the first UE (e.g., UE 120a) performs operations associated with techniques and apparatuses for sidelink discovery between UEs associated with different discovery models.

As shown in FIG. 14, in some aspects, process 1400 may include receiving a beam training response sequence in a direction from a second UE (block 1410). For example, the UE (e.g., using reception component 1502, depicted in FIG. 15) may receive a beam training response sequence in a direction from a second UE, as described above.

As further shown in FIG. 14, in some aspects, process 1400 may include determining that a discovery announcement message has not been received in the direction from the second UE based at least in part on a device discovery model associated with the second UE being different than a device discovery model associated with the first UE (block 1420). For example, the UE (e.g., using determination component 1510, depicted in FIG. 15) may determine that a discovery announcement message has not been received in the direction from the second UE based at least in part on a device discovery model associated with the second UE being different than a device discovery model associated with the first UE, as described above.

As further shown in FIG. 14, in some aspects, process 1400 may include performing a device discovery with the second UE based at least in part on the device discovery model associated with the second UE being different than the device discovery model associated with the first UE (block 1430). For example, the UE (e.g., using performance component 1508, depicted in FIG. 15) may perform a device discovery with the second UE based at least in part on the device discovery model associated with the second UE being different than the device discovery model associated with the first UE, as described above.

Process 1400 may include additional aspects, such as any single aspect or any combination of aspects described below and/or in connection with one or more other processes described elsewhere herein.

In a first aspect, process 1400 includes determining that the beam training response sequence is associated with the second UE that has not been discovered by the first UE based at least in part on discovery announcement messages that have been received at the first UE.

In a second aspect, alone or in combination with the first aspect, performing the device discovery comprises transmitting a discovery request message in the direction associated with the beam training response sequence to the second UE, and monitoring a channel to receive a discovery response message from the second UE.

In a third aspect, alone or in combination with one or more of the first and second aspects, performing the device discovery comprises monitoring a channel to receive a discovery announcement message from the second UE in accordance with a timer, and transmitting a discovery request message in the direction associated with the beam training response sequence to the second UE based at least in part on an expiry of the timer.

In a fourth aspect, alone or in combination with one or more of the first through third aspects, the first UE is associated with a first device discovery model, and the second UE is associated with a second device discovery model.

In a fifth aspect, alone or in combination with one or more of the first through fourth aspects, performing the device discovery comprises performing the device discovery based at least in part on a device discovery model associated with the first UE, and further comprises stopping a transmission of discovery request messages in the direction associated with the beam training response sequence and monitoring a channel to listen for discovery announcement messages from the second UE.

In a sixth aspect, alone or in combination with one or more of the first through fifth aspects, performing the device discovery comprises performing the device discovery based at least in part on a device discovery model associated with the second UE, and further comprises transmitting discovery request messages to the second UE.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
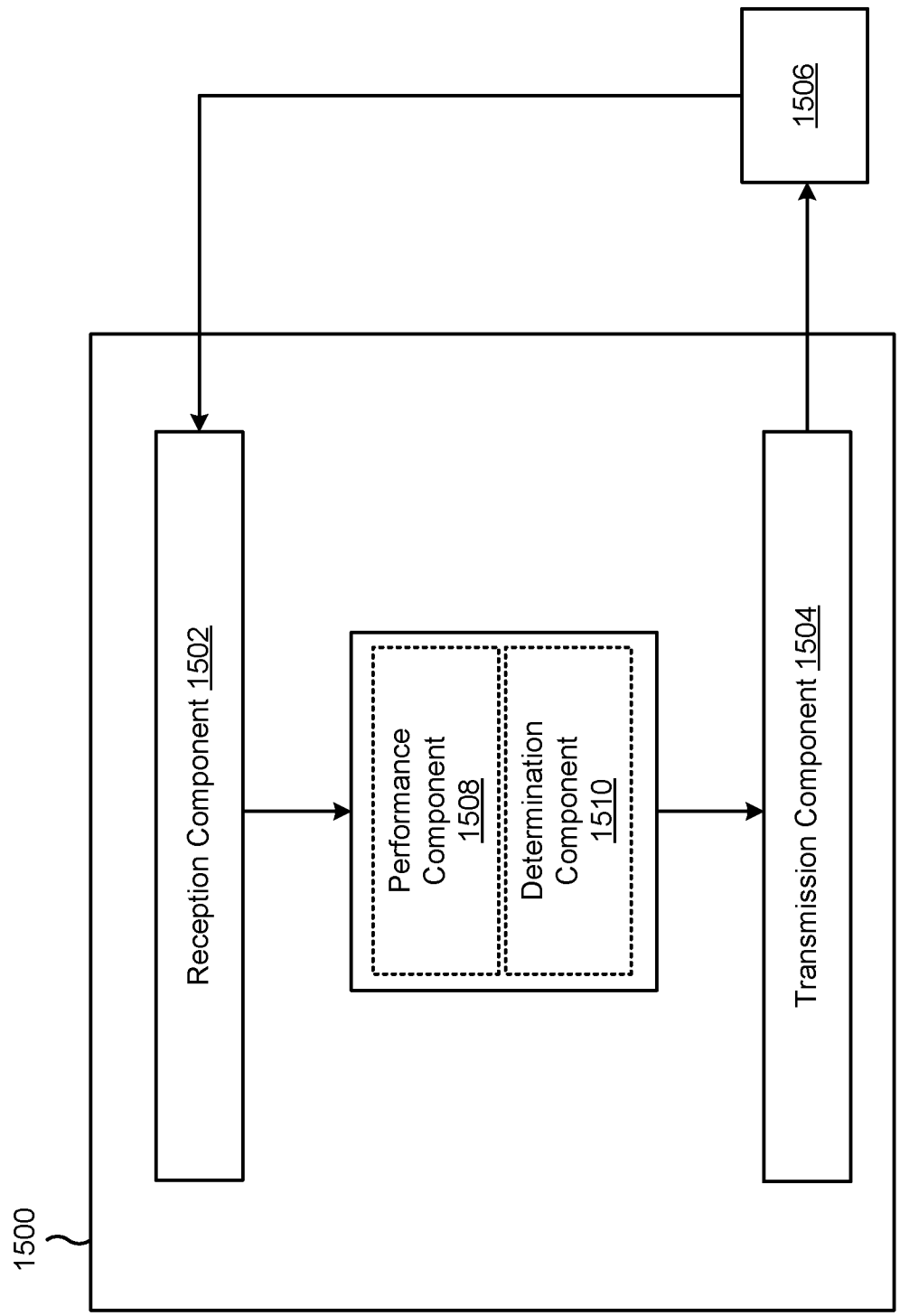
FIG. 15 is a block diagram of an example apparatus for wireless communication, in accordance with various aspects of the present disclosure.

FIG. 15 is a block diagram of an example apparatus 1500 for wireless communication. The apparatus 1500 may be a first UE, or a first UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include one or more of a performance component 1508, or a determination component 1510, among other examples.

In some aspects, the apparatus 1500 may be configured to perform one or more operations described herein in connection with FIGS. 7-10. Additionally, or alternatively, the apparatus 1500 may be configured to perform one or more processes described herein, such as process 1100 of FIG. 11, process 1200 of FIG. 12, process 1300 of FIG. 13, process 1400 of FIG. 14, or a combination thereof. In some aspects, the apparatus 1500 and/or one or more components shown in FIG. 15 may include one or more components of the first UE described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the first UE described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the first UE described above in connection with FIG. 2. In some aspects, the transmission component 1504 may be co-located with the reception component 1502 in a transceiver.

The reception component 1502 may receive, from a second UE via a sidelink interface between the first UE and the second UE, an indication of a device discovery model associated with the second UE, wherein the device discovery model associated with the second UE is different than a device discovery model associated with the first UE. The performance component 1508 may perform a device discovery with the second UE based at least in part on the device discovery model associated with the second UE. The determination component 1510 may determine that the device discovery model associated with the second UE is different than the device discovery model associated with the first UE.

The transmission component 1504 may transmit, to a second UE via a sidelink interface between the first UE and the second UE, an indication of a device discovery model associated with the first UE, wherein a device discovery model associated with the second UE is initially different than the device discovery model associated with the first UE. The performance component 1508 may perform a device discovery with the second UE based at least in part on the device discovery model associated with the first UE.

The transmission component 1504 may transmit a beam training response sequence in a direction to a second UE. The determination component 1510 may determine that a discovery request message has not been received in the direction from the second UE based at least in part on a device discovery model associated with the second UE being different than a device discovery model associated with the first UE. The performance component 1508 may perform a device discovery with the second UE based at least in part on the device discovery model associated with the second UE being different than the device discovery model associated with the first UE.

The reception component 1502 may receive a beam training response sequence in a direction from a second UE. The determination component 1510 may determine that a discovery announcement message has not been received in the direction from the second UE based at least in part on a device discovery model associated with the second UE being different than a device discovery model associated with the first UE. The performance component 1508 may perform a device discovery with the second UE based at least in part on the device discovery model associated with the second UE being different than the device discovery model associated with the first UE. The determination component 1510 may determine that the beam training response sequence is associated with the second UE that has not been discovered by the first UE based at least in part on discovery announcement messages that have been received at the first UE.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a first user equipment (UE), comprising: receiving, from a second UE via a sidelink interface between the first UE and the second UE, an indication of a device discovery model associated with the second UE, wherein the device discovery model associated with the second UE is different than a device discovery model associated with the first UE; and performing a device discovery with the second UE based at least in part on the device discovery model associated with the second UE.

Aspect 2: The method of Aspect 1, wherein the indication is a beam training reference signal sequence.

Aspect 3: The method of any of Aspects 1 through 2, wherein the indication is a beam training response sequence.

Aspect 4: The method of any of Aspects 1 through 3, wherein the indication is a sequence selected from a first set of sequences associated with a first device discovery model.

Aspect 5: The method of any of Aspects 1 through 4, wherein the indication is a sequence selected from a second set of sequences associated with a second device discovery model.

Aspect 6: The method of any of Aspects 1 through 5, wherein the indication is a sequence, and further comprising: receiving, from a base station, a configuration that indicates: a first set of sequences including the sequence associated with a first device discovery model, or a second set of sequences including the sequence associated with a second device discovery model.

Aspect 7: The method of any of Aspects 1 through 6, further comprising: determining that the device discovery model associated with the second UE is different than the device discovery model associated with the first UE.

Aspect 8: The method of any of Aspects 1 through 7, wherein the indication is a first indication, and wherein performing the device discovery comprises transmitting a second indication to the second UE based at least in part on the device discovery model associated with the second UE, and wherein the first indication is a beam training reference signal sequence and the second indication is a beam training response sequence.

Aspect 9: A method of wireless communication performed by a first user equipment (UE), comprising: transmitting, to a second UE via a sidelink interface between the first UE and the second UE, an indication of a device discovery model associated with the first UE, wherein a device discovery model associated with the second UE is initially different than the device discovery model associated with the first UE; and performing a device discovery with the second UE based at least in part on the device discovery model associated with the first UE.

Aspect 10: The method of Aspect 9, wherein the indication is a beam training reference signal sequence.

Aspect 11: The method of any of Aspects 9 through 10, wherein the indication is a beam training response sequence.

Aspect 12: The method of any of Aspects 9 through 11, wherein the indication is a sequence, and further comprising: selecting the sequence from a first set of sequences associated with a first device discovery model.

Aspect 13: The method of any of Aspects 9 through 12, wherein the indication is a sequence, and further comprising: selecting the sequence from a second set of sequences associated with a second device discovery model.

Aspect 14: The method of any of Aspects 9 through 13, wherein the indication is a sequence, and further comprising: receiving, from a base station, a configuration that indicates: a first set of sequences including the sequence associated with a first device discovery model, or a second set of sequences including the sequence associated with a second device discovery model.

Aspect 15: The method of any of Aspects 9 through 14, wherein the indication is a first indication, and wherein performing the device discovery comprises receiving a second indication to the second UE based at least in part on the device discovery model associated with the second UE, and wherein the first indication is a beam training reference signal sequence and the second indication is a beam training response sequence.

Aspect 16: A method of wireless communication performed by a first user equipment (UE), comprising: transmitting a beam training response sequence in a direction to a second UE; determining that a discovery request message has not been received in the direction from the second UE based at least in part on a device discovery model associated with the second UE being different than a device discovery model associated with the first UE; and performing a device discovery with the second UE based at least in part on the device discovery model associated with the second UE being different than the device discovery model associated with the first UE.

Aspect 17: The method of Aspect 16, wherein performing the device discovery comprises: transmitting a discovery announcement in the direction associated with the beam training response sequence to the second UE; and monitoring a channel to receive a discovery response message from the second UE.

Aspect 18: The method of any of Aspects 16 through 17, wherein performing the device discovery comprises: monitoring a channel to receive a discovery request message from the second UE in accordance with a timer; and transmitting a discovery announcement message in the direction associated with the beam training response sequence to the second UE based at least in part on an expiry of the timer.

Aspect 19: The method of any of Aspects 16 through 18, wherein the first UE is associated with a first device discovery model, and the second UE is associated with a second device discovery model.

Aspect 20: The method of any of Aspects 16 through 19, wherein performing the device discovery comprises performing the device discovery based at least in part on a device discovery model associated with the first UE.

Aspect 21: The method of any of Aspects 16 through 20, wherein performing the device discovery based at least in part on the device discovery model associated with the first UE further comprises transmitting discovery announcement messages to the second UE, and wherein discovery request messages are not received from the second UE in the direction associated with the beam training response sequence.

Aspect 22: The method of any of Aspects 16 through 21, wherein performing the device discovery comprises performing the device discovery based at least in part on a device discovery model associated with the second UE.

Aspect 23: The method of any of Aspects 16 through 22, wherein performing the device discovery based at least in part on the device discovery model associated with the second UE further comprises stopping a transmission of discovery announcement messages and monitoring a channel to listen for discovery request messages from the second UE.

Aspect 24: A method of wireless communication performed by a first user equipment (UE), comprising: receiving a beam training response sequence in a direction from a second UE; determining that a discovery announcement message has not been received in the direction from the second UE based at least in part on a device discovery model associated with the second UE being different than a device discovery model associated with the first UE; and performing a device discovery with the second UE based at least in part on the device discovery model associated with the second UE being different than the device discovery model associated with the first UE.

Aspect 25: The method of Aspect 24, further comprising: determining that the beam training response sequence is associated with the second UE that has not been discovered by the first UE based at least in part on discovery announcement messages that have been received at the first UE.

Aspect 26: The method of any of Aspects 24 through 25, wherein performing the device discovery comprises: transmitting a discovery request message in the direction associated with the beam training response sequence to the second UE; and monitoring a channel to receive a discovery response message from the second UE.

Aspect 27: The method of any of Aspects 24 through 26, wherein performing the device discovery comprises: monitoring a channel to receive a discovery announcement message from the second UE in accordance with a timer; and transmitting a discovery request message in the direction associated with the beam training response sequence to the second UE based at least in part on an expiry of the timer.

Aspect 28: The method of any of Aspects 24 through 27, wherein the first UE is associated with a first device discovery model, and the second UE is associated with a second device discovery model.

Aspect 29: The method of any of Aspects 24 through 28, wherein performing the device discovery comprises performing the device discovery based at least in part on a device discovery model associated with the first UE, and further comprises stopping a transmission of discovery request messages in the direction associated with the beam training response sequence and monitoring a channel to listen for discovery announcement messages from the second UE.

Aspect 30: The method of any of Aspects 24 through 29, wherein performing the device discovery comprises performing the device discovery based at least in part on a device discovery model associated with the second UE, and further comprises transmitting discovery request messages to the second UE.

Aspect 31: An apparatus for wireless communication at a device, comprising a processor; memory coupled with the processor; and instructions stored in the memory and executable by the processor to cause the apparatus to perform the method of one or more Aspects of Aspects 1-30.

Aspect 32: A device for wireless communication, comprising a memory and one or more processors coupled to the memory, the memory and the one or more processors configured to perform the method of one or more Aspects of Aspects 1-30.

Aspect 33: An apparatus for wireless communication, comprising at least one means for performing the method of one or more Aspects of Aspects 1-30.

Aspect 34: A non-transitory computer-readable medium storing code for wireless communication, the code comprising instructions executable by a processor to perform the method of one or more Aspects of Aspects 1-30.

Aspect 35: A non-transitory computer-readable medium storing a set of instructions for wireless communication, the set of instructions comprising one or more instructions that, when executed by one or more processors of a device, cause the device to perform the method of one or more Aspects of Aspects 1-30.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:
receiving, from a second UE configured to perform discovery using a first type of device discovery model, a sequence indicating the first type of device discovery model,
wherein the sequence is received via a sidelink interface between the first UE and the second UE,
wherein the first UE is operating under a second type of device discovery model, and
wherein the first type of device discovery model is different than the second type of device discovery model;
switching from the second type of device discovery model to the first type of device discovery model in accordance with the sequence received from the second UE; and
performing a device discovery with the second UE using the first type of device discovery model.

2. The method of claim 1, wherein the sequence is a beam training reference signal sequence.

3. The method of claim 1, wherein the sequence is a beam training response sequence.

4. The method of claim 1, wherein the sequence is selected from a first set of sequences associated with the first type of device discovery model.

5. The method of claim 1, wherein the sequence is selected from a first set of sequences associated with the first type of device discovery model and a second set of sequences associated with the second type of device discovery model.

6. The method of claim 1, further comprising:
receiving, from a network entity, a configuration that indicates:
a first set of sequences associated with the first type of device discovery model, or
a second set of sequences associated with the second type of device discovery model.

7. The method of claim 1, further comprising:
determining that the first UE and the second UE are associated with different device discovery models; and
wherein switching from the second type of device discovery model to the first type of device discovery model comprises:
switching from the second type of device discovery model to the first type of device discovery model based at least in part on determining that the first UE and the second UE are associated with different device discovery models.

8. The method of claim 1, wherein the sequence is a first sequence,
wherein performing the device discovery comprises transmitting a second sequence to the second UE based at least in part on the second UE being associated with the first type of device discovery model, and
wherein the first sequence is a beam training reference signal sequence and the second sequence is a beam training response sequence.

9. A method of wireless communication performed by a first user equipment (UE), comprising:
transmitting, to a second UE configured to perform discovery using a first type of device discovery model, a sequence indicating a second type of device discovery model associated with the first UE,
wherein the sequence is transmitted via a sidelink interface between the first UE and the second UE,
wherein the first UE is operating under the second type of device discovery model,
wherein the second type of device discovery model is different than the first type of device discovery model, and
wherein the second UE is switched to being associated with the second type of device discovery model in accordance with the sequence transmitted to the second UE; and
performing a device discovery with the second UE based at least in part on the second type of device discovery model.

10. The method of claim 9, wherein the sequence is a beam training reference signal sequence.

11. The method of claim 9, wherein the sequence is a beam training response sequence.

12. The method of claim 9, wherein the method further comprises:
selecting the sequence from a first set of sequences associated with the second type of device discovery model.

13. The method of claim 9, wherein the method further comprises:
selecting the sequence from a first set of sequences associated with the first type of device discovery model and a second set of sequences associated with the second type of device discovery model.

14. The method of claim 9, wherein the method further comprises:
receiving, from a network entity, a configuration that indicates:
a first set of sequences associated with the first type of device discovery model, or
a second set of sequences associated with the second type of device discovery model.

15. The method of claim 9, wherein the sequence is a first sequence,
wherein performing the device discovery comprises receiving a second sequence from the second UE based at least in part on the first type of device discovery model, and
wherein the first sequence is a beam training reference signal sequence and the second sequence is a beam training response sequence.

16. A method of wireless communication performed by a first user equipment (UE), comprising:
transmitting a beam training response sequence to a second UE configured to perform discovery using a first type of device discovery model;
determining that a discovery request message has not been received from the second UE based at least in part on the first type of device discovery model being different than a second type of device discovery model associated with the first UE,
wherein the first UE is operating under the second type of device discovery model;
modifying a used device discovery model to match the first type of device discovery model based at least in part on the second UE being configured to perform discovery using the first type of device discovery model; and
performing a device discovery with the second UE based at least in part on the first type of device discovery model.

17. The method of claim 16, wherein performing the device discovery comprises:
transmitting a discovery announcement to the second UE; and
monitoring a channel to receive a discovery response message from the second UE.

18. The method of claim 16, wherein performing the device discovery comprises:
monitoring a channel to receive a discovery request message from the second UE in accordance with a timer; and
transmitting a discovery announcement message to the second UE based at least in part on an expiry of the timer.

19. The method of claim 16, wherein performing the device discovery based at least in part on the first type of device discovery model further comprises stopping a transmission of discovery announcement messages and monitoring a channel to listen for discovery request messages from the second UE.

20. The method of claim 16, further comprising:
receiving a beam training reference signal sequence from the second UE; and
wherein transmitting the beam training response sequence to the second UE comprises:
transmitting the beam training response sequence to the second UE based at least in part on receiving the beam training reference signal sequence from the second UE.

21. The method of claim 16, wherein transmitting the beam training response sequence comprises:
transmitting the beam training response sequence based at least in part on a beam training reference signal received from the second UE.

22. The method of claim 21, further comprising:
determining that the second UE is configured to use the first type of device discovery model based at least in part on the beam training reference signal.

23. The method of claim 16, wherein the beam training response sequence is a random access channel (RACH) message.

24. The method of claim 16, further comprising:
determining that the second UE is configured to use the first type of device discovery model based at least in part on the beam training response sequence.

25. A method of wireless communication performed by a first user equipment (UE), comprising:
receiving a beam training response sequence from a second UE configured to perform discovery using a first type of device discovery model;
determining that a discovery announcement message has not been received from the second UE based at least in part on a second type of device discovery model associated with the first UE being different than the first type of device discovery model,
wherein the first UE is operating under the second type of device discovery model;
modifying a used device discovery model to match the first type of device discovery model based at least in part on the second UE being configured to perform discovery using the second type of device discovery model; and
performing a device discovery with the second UE based at least in part on the first type of device discovery model.

26. The method of claim 25, further comprising:
determining that the beam training response sequence is associated with the second UE that has not been discovered by the first UE based at least in part on discovery announcement messages that have been received at the first UE.

27. The method of claim 25, wherein performing the device discovery comprises:
transmitting a discovery request message to the second UE; and
monitoring a channel to receive a discovery response message from the second UE.

28. The method of claim 25, wherein performing the device discovery comprises:
monitoring a channel to receive a discovery announcement message from the second UE in accordance with a timer; and
transmitting a discovery request message to the second UE based at least in part on an expiry of the timer.

29. The method of claim 25, wherein performing the device discovery comprises transmitting discovery request messages to the second UE.

30. The method of claim 25, further comprising:
transmitting a beam training reference signal sequence to the second UE; and
wherein receiving the beam training response sequence from the second UE comprises:
receiving the beam training response sequence from the second UE based at least in part on transmitting the beam training reference signal sequence to the second UE.

* * * * *